United States Patent
Ohishi

(10) Patent No.: US 8,068,665 B2
(45) Date of Patent: Nov. 29, 2011

(54) 3D-IMAGE PROCESSING APPARATUS, 3D-IMAGE PROCESSING METHOD, STORAGE MEDIUM, AND PROGRAM

(75) Inventor: Satoru Ohishi, Otawara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 1059 days.

(21) Appl. No.: 11/688,441

(22) Filed: Mar. 20, 2007

(65) Prior Publication Data
US 2007/0206848 A1  Sep. 6, 2007

Related U.S. Application Data

(63) Continuation-in-part of application No. 11/430,912, filed on May 10, 2006, now abandoned.

(30) Foreign Application Priority Data

May 10, 2005  (JP) .................................. 2005-137381

(51) Int. Cl.
G06K 9/00 (2006.01)
H04N 7/12 (2006.01)
G01D 18/00 (2006.01)
(52) U.S. Cl. ......... 382/154; 382/132; 348/419; 378/207
(58) Field of Classification Search .................. 382/132, 382/107, 218, 225, 302, 170, 190, 275, 154; 345/420, 643, 419; 378/63, 62, 207; 375/240.17; 385/119; 348/14.1, 410
See application file for complete search history.

(56) References Cited

U.S. PATENT DOCUMENTS

| | | | | |
|---|---|---|---|---|
| 6,404,913 B1* | 6/2002 | Ohki | ............................. | 382/154 |
| 6,445,182 B1* | 9/2002 | Dean et al. | .................... | 324/309 |
| 6,650,724 B2* | 11/2003 | Strobel | ............................. | 378/4 |
| 7,379,565 B2* | 5/2008 | Blonde et al. | ................. | 382/107 |
| 7,432,924 B2* | 10/2008 | Ohishi | ........................... | 345/419 |

FOREIGN PATENT DOCUMENTS

| | | |
|---|---|---|
| JP | 5-137711 | 6/1993 |
| JP | 9-133771 | 5/1997 |
| JP | 10-137231 | 5/1998 |
| JP | 2000-40145 | 2/2000 |
| JP | 2001-37761 | 2/2001 |

OTHER PUBLICATIONS

Office Action issued May 10, 2011 in Japanese Application No. 2006-131786 (w/English translation).

* cited by examiner

*Primary Examiner* — Sheela C Chawan
(74) *Attorney, Agent, or Firm* — Oblon, Spivak, McClelland, Maier & Neustadt, L.L.P.

(57) ABSTRACT

A 3D-image processing apparatus includes a storage unit which stores data of a first 3D image together with data of a second 3D image as a combining target with the first 3D image and data of a third 3D image relevant to the second 3D image, a misregistration calculating unit which calculates a misregistration between the first 3D image and the third 3D image, and an image combining unit which registers and combines the second 3D image with the first 3D image on the basis of the calculated misregistration.

18 Claims, 13 Drawing Sheets

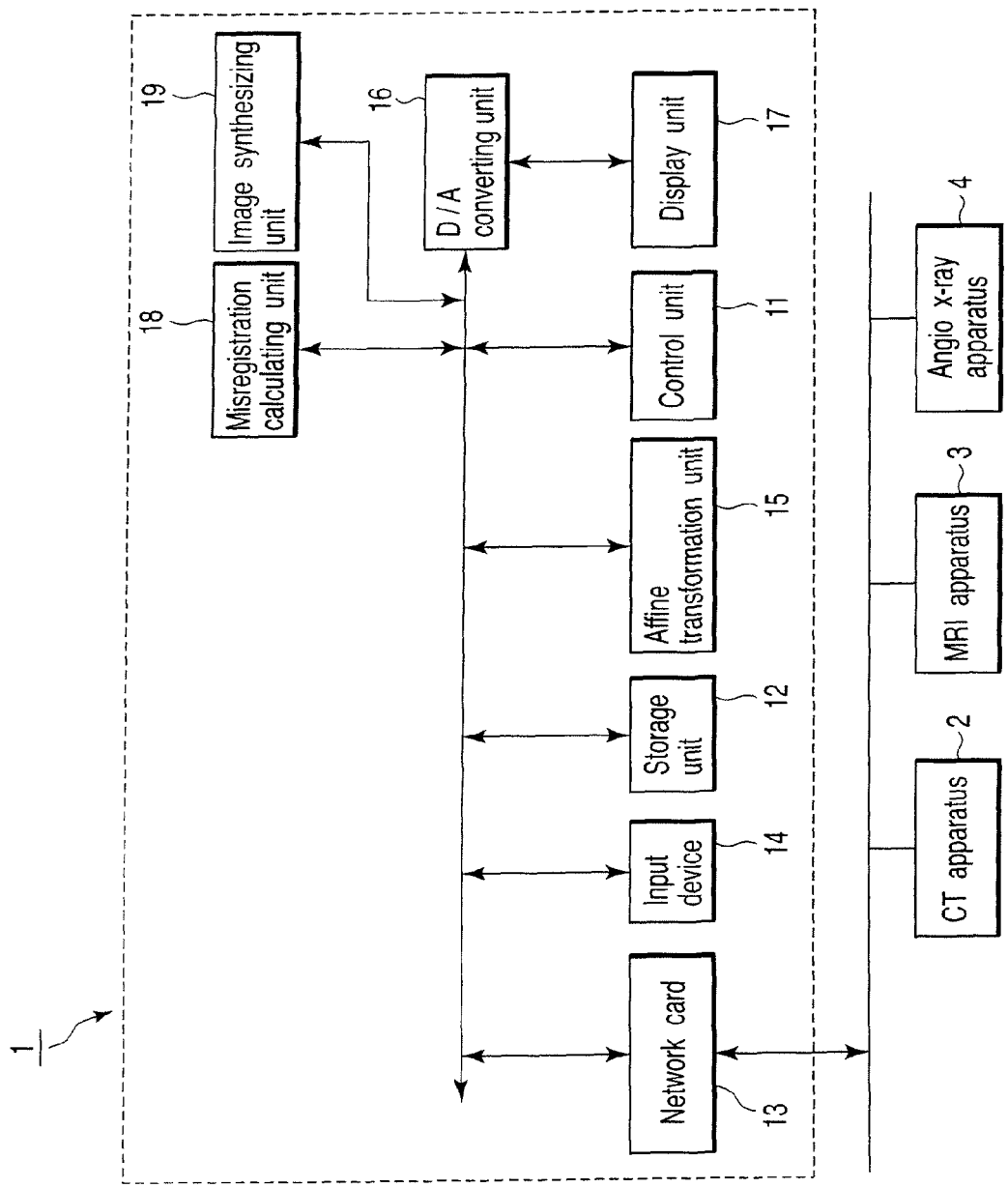
F I G. 1

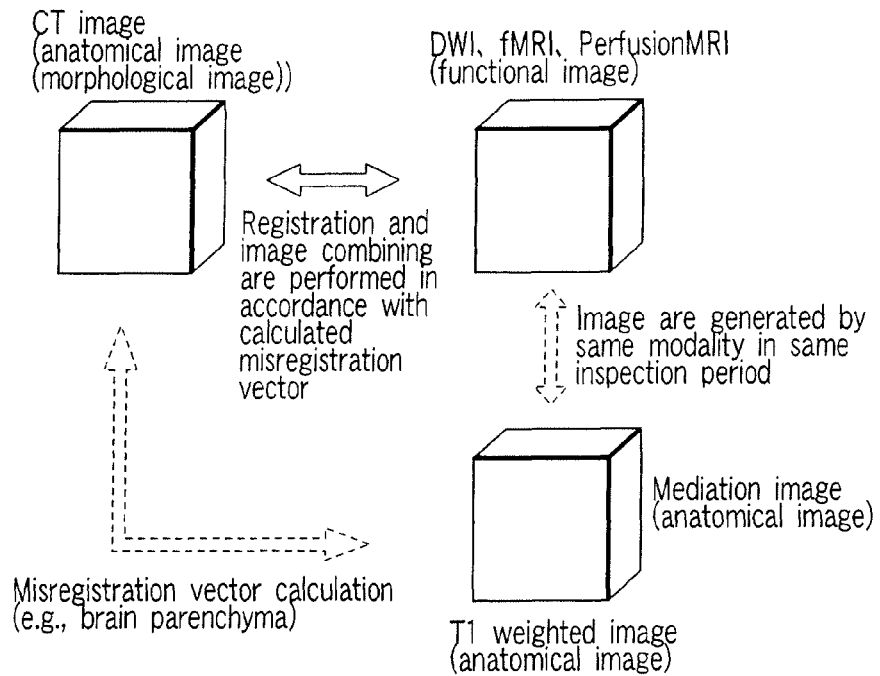
F I G. 12
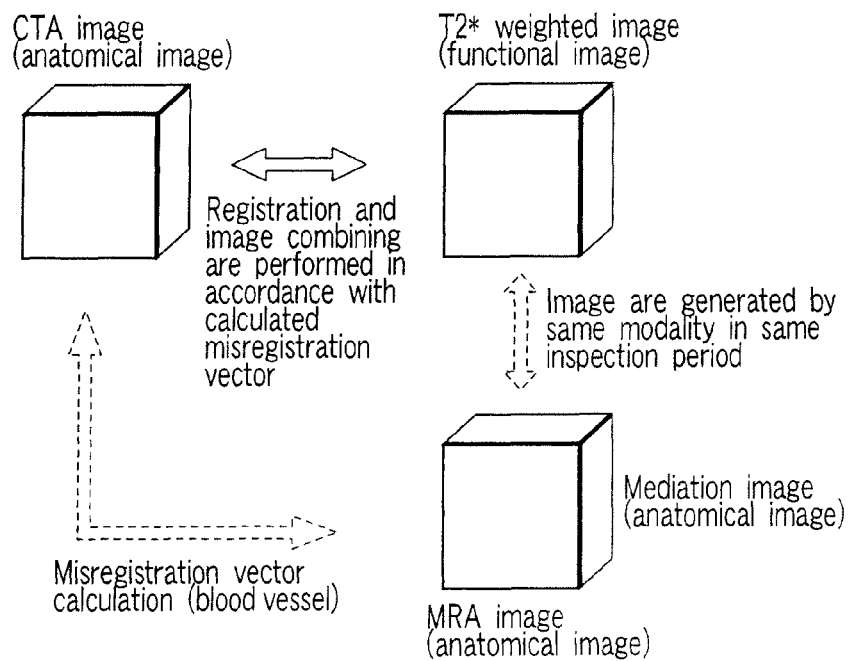
F I G. 13

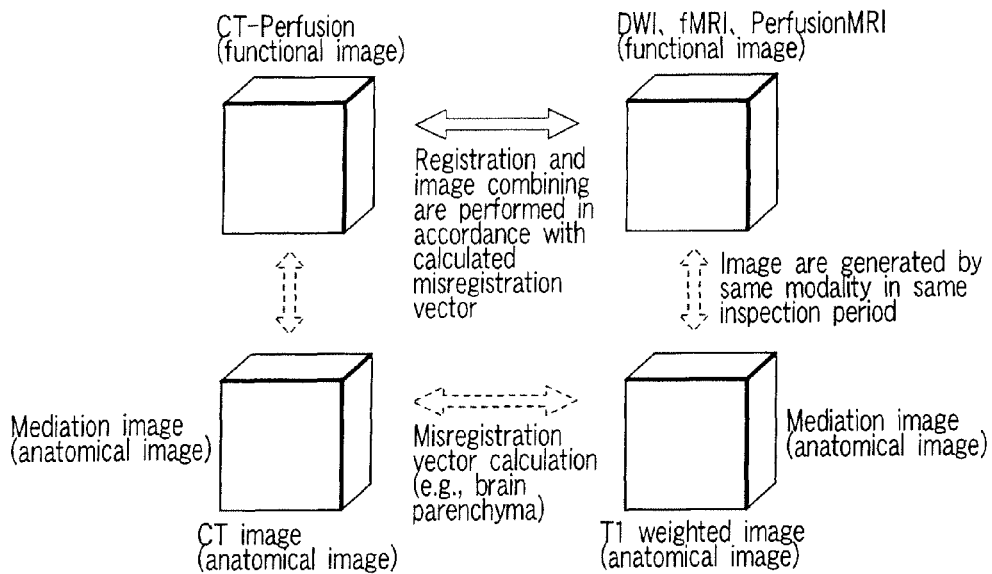
F I G. 18
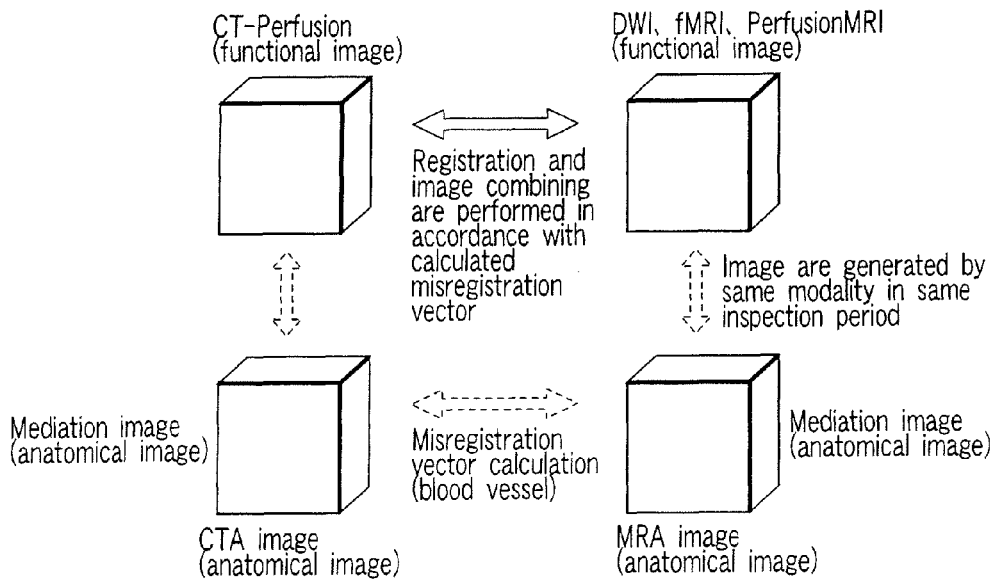
F I G. 19

3D-IMAGE PROCESSING APPARATUS, 3D-IMAGE PROCESSING METHOD, STORAGE MEDIUM, AND PROGRAM

CROSS-REFERENCE TO RELATED APPLICATIONS

This is a Continuation-in-Part application of U.S. patent application Ser. No. 11/430,912, filed May 10, 2006, the entire contents of which are incorporated herein by reference.

This application is based upon and claims the benefit of priority from prior Japanese Patent Application No. 2005-137381, filed May 10, 2005, the entire contents of which are incorporated herein by reference.

BACKGROUND OF THE INVENTION

1. Field of the Invention

The present invention relates to a 3D (three-dimensional)-image processing apparatus and a 3D-image processing method, which process and display various 3D-image data obtained by diagnosing a subject. The invention relates to a control program for use in the 3D-image processing apparatus.

2. Description of the Related Art

A technology is known, in which a subject is diagnosed at high accuracy by synthesizing images of the subject, which have been prepared by using various diagnostic systems. As known in the art, this technology is used in surgical operations.

Particularly, it is used when a 3D image of the structure of the bones, internal organs and the like, obtained by computed tomography (CT), is synthesized with a 3D image representing the functional of the bones, internal organs and the like, obtained by magnetic resonance imaging (MRI). Before the two 3D are synthesized, they are associated or the markers attached them are associated, thereby correcting the displacement of the 3D images. Thus, desirable synthesized information is acquired (see, for example, Jpn. Pat. Appln. KOKAI Publication No. 5-137711).

However, many manual operations are required to associate the two images obtained by CT and MRI or to attach markers to these images. The operator's workload is inevitably heavy. This is because the subject is scanned from various directions in the process of providing the 3D images. Ultimately, it is difficult to achieve an accurate diagnosis in a short time.

BRIEF SUMMARY OF THE INVENTION

It is an object of the present invention to reduce registration workload for image combining, improve the registration accuracy of image combining, and increase image combining targets.

According to a first aspect of the present invention, there is provided a 3D-image processing apparatus comprising a storage unit which stores data of a first 3D image together with data of a second 3D image as a combining target with the first 3D image and data of a third 3D image relevant to the second 3D image, a misregistration calculating unit which calculates a misregistration between the first 3D image and the third 3D image, and an image combining unit which registers and combines the second 3D image with the first 3D image on the basis of the calculated misregistration.

According to a second aspect of the present invention, there is provided a 3D-image processing apparatus comprising a storage unit which stores data of a first 3D image, second 3D image, and third 3D image associated with the same subject, a misregistration calculating unit which calculates a first misregistration between the first 3D image and the third 3D image and a second misregistration between the second 3D image and the third 3D image, and an image combining unit which registers and combines the first 3D image and the second 3D image on the basis of the calculated first misregistration and the calculated second misregistration.

According to a third aspect of the present invention, there is provided a 3D-image processing apparatus comprising a storage unit which stores data of a first 3D image, data of a second 3D image as a combining target with the first 3D image, data of a third 3D image relevant to the first 3D image, and data of a fourth 3D image relevant to the second 3D image, a misregistration calculating unit which calculates a misregistration between the third 3D image and the fourth 3D image, and an image combining unit which registers and combines the first 3D image and the second 3D image on the basis of the calculated misregistration.

According to a fourth aspect of the present invention, there is provided a 3D-image processing apparatus comprising a storage unit which stores data of a first 3D image, second 3D image, third 3D image, and fourth 3D image associated with the same subject, a misregistration calculating unit which calculates a first misregistration between the first 3D image and the second 3D image, a second misregistration between the second 3D image and the third 3D image, and a third misregistration between the third 3D image and the fourth 3D image, and an image combining unit which registers and combines the first 3D image and the fourth 3D image on the basis of the calculated first misregistration, the calculated second misregistration, and the calculated third mediation image.

According to a fifth aspect of the present invention, there is provided a 3D-image processing method comprising inputting data of a first 3D image together with data of a second 3D image as a combining target with the first 3D image and data of a third 3D image relevant to the second 3D image, calculating a misregistration between the first 3D image and the third 3D image, and registering and combining the second 3D image with the first 3D image on the basis of the calculated misregistration.

According to a sixth aspect of the present invention, there is provided a computer-readable storage medium recording a program for causing a computer to implement storage means for storing data of a first 3D image together with data of a second 3D image as a combining target with the first 3D image and data of a third 3D image relevant to the second 3D image, means for calculating a misregistration between the first 3D image and the third 3D image, and means for registering and combining the second 3D image with the first 3D image on the basis of the calculated misregistration.

According to a seventh aspect of the present invention, there is provided a program for causing a computer to implement storage means for storing data of a first 3D image together with data of a second 3D image as a combining target with the first 3D image and data of a third 3D image relevant to the second 3D image, means for calculating a misregistration between the first 3D image and the third 3D image, and means for registering and combining the second 3D image with the first 3D image on the basis of the calculated misregistration.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a 3D-image processing apparatus that is a first embodiment of the present invention;

FIG. 12 is a view showing a first specific example of image combining according to the eighth embodiment;

FIG. 13 is a view showing a second specific example of image combining according to the eighth embodiment;

FIG. 18 is a view showing a seventh specific example of image combining according to the eighth embodiment; and FIG. 19 is a view showing an eighth specific example of image combining according to the eighth embodiment.

DETAILED DESCRIPTION OF THE INVENTION

Figure 2:
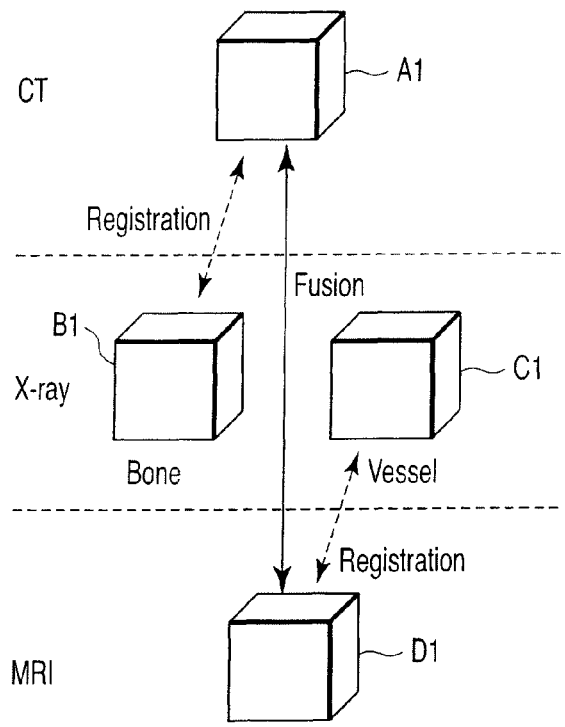
FIG. 2 is a diagram explaining how various images are processed to synthesize CT image data with MRI image data in the first embodiment.

Embodiments of the present invention will be described below in detail with reference to the accompanying drawings.

First Embodiment

FIG. 1 is a block diagram showing a 3D-image processing apparatus that is a first embodiment of the present invention.

As FIG. 1 shows, the 3D-image processing apparatus 1 is connected to a CT apparatus 2, an MRI apparatus 3, and an angio-X-ray apparatus 4.

The 3D-image processing apparatus 1 has a control unit 11, a storage unit 12, a network card 13, an input device 14, an affine transformation unit 15, an A/D (analog-to-digital) converting unit 16, a display unit 17, a displacement-calculating unit 18, and an image-synthesizing unit 19. The control unit 11 comprises a microcomputer. The input device 14 comprises a keyboard and a mouse. Of these components, the network card 13 is connected to the CT apparatus 2, the MRI apparatus 3 and the angio-X-ray apparatus 4, and display unit 17 are connected to the A/D converting unit 16.

When instructed by the control unit 11, the storage unit 12 stores various data items, such as image data, synthesized image data, and the like inputted through the network card 13. The affine transformation unit 15 performs a magnification process and a movement process on the image data.

The displacement-calculating unit 18 reads CT image data generated by the CT apparatus 2 and stored in the storage unit 12. It reads MRI data generated by the MRI apparatus 3. It reads the mask 3D-image data and 3D-DSA image data generated by the angio-X-ray apparatus 4, too. The unit 18 detects displacement between the CT image data and the mask 3D-image data, and displacement between the mask 3D-image data and the 3D-DSA image data, and displacement between the 3D-DSA (Digital Subtraction Angiography) image data and the MRI data. The unit 18 then finds displacement between the CT image data and the MRI data, from the information representing the displacement.

The image-synthesizing unit 19 synthesizes 3D images of two or more types, on the basis of the displacement information provided by the displacement-calculating unit 18.

How the 3D-image processing apparatus 1 thus configured operates will be described.

Figure 3:
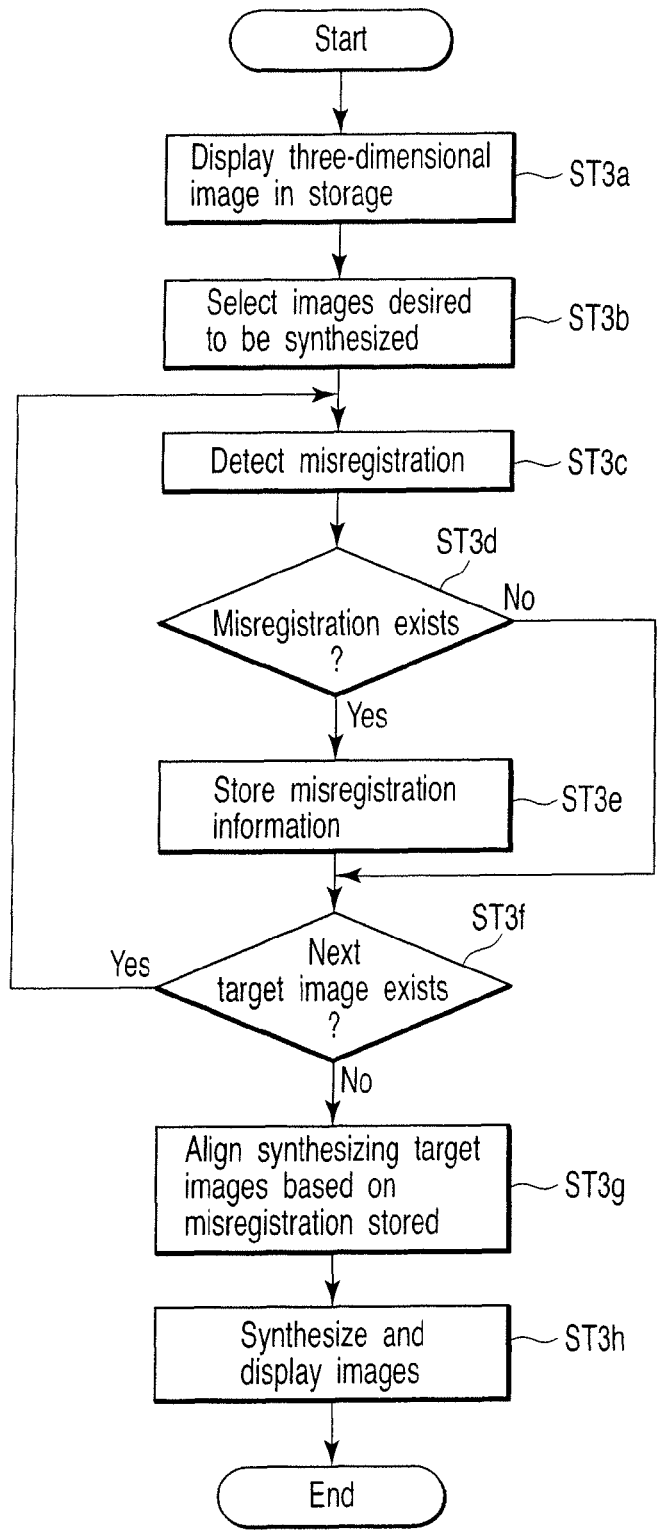
FIG. 3 is a flowchart explaining a procedure of controlling the 3D-image processing apparatus, i.e., the first embodiment, to synthesize the CT image data with the MRI image.

FIG. 2 is a diagram explaining how various images are processed to synthesize CT image data with MRI image data. FIG. 3 is a flowchart explaining a procedure of controlling the 3D-image processing apparatus, i.e., the first embodiment, to synthesize the CT image data with the MRI image.

The CT apparatus 2 collects and reconstructs the 3D-CT images of an arbitrary region in a subject. These reconstructed 3D-CT image data is transmitted to the 3D-image processing apparatus 1. In the apparatus 1, the data is stored in the storage unit 12.

The angio-X-ray apparatus 4 is rotated around the subject, photographing the region in the subject, from various directions, before and after the injection of the contrast medium. A mask 3D image is reconstructed from the images provided before the injection of the contrast medium. The angio-X-ray apparatus 4 subtracting each image provided before the injection from the corresponding image provided after the injection, by scanning the region in the subject from the same direction. Thus, the apparatus 4 prepares a rotated DSA image. The angio-X-ray apparatus 4 reconstructs a 3D-DSA image from the rotated DSA images thus prepared. Two 3D-image data items are transmitted to the 3D-image processing apparatus 1 and stored in the storage unit 12.

The 3D-image processing apparatus 1 starts the control shown in FIG. 3. In Step ST3a, the display unit 17 displays the 3D-CT image (image A1), mask 3D image (image B1), 3D-DSA image (image C1) and MRI (image D1), all stored in the storage unit 12. The user (operator) may operate the input device 14, thus selecting an [Indirect Fusion] button. Images A1 and D1, which are fusion target images, are thereby selected. Further, the user sets registration of B1 and A1, registration of B1 and C1, and registration of C1 and D1 (thus, drawing a relationship line on GUI). Then, the 3D-image processing apparatus 1 proceeds from Step ST3b to Step ST3c. In Step ST3c, the apparatus 1 calculates the displacement. More specifically, the apparatus 1 performs a threshold process, extracting only an image of the bone only B1 and A1. The apparatus 1 then performs cross-correlation on bone images B2 and A2, finding a displacement vector that has a minimum value. Assume that the shifts of (x1, y1, and z1) and the rotations of (Δθx1, Δθy1, and Δθz1) are required to align B2 to the position of the A1. Then, the 3D-image processing apparatus 1 goes from Step ST3d to Step ST3e. In Step ST3e, the storage unit 12 stores the displacement information. Note that Δθx1, Δθy1, and Δθz1 are rotations around axes x, y and z, respectively.

Next, the 3D-image processing apparatus 1 determines whether an image to become a next target exists (Step ST3f). Since C1 exists, the 3D-image processing apparatus 1 goes to Step ST3c. In Step ST3c, it calculates the displacement between B1 and C1. Since B1 and C1 have been reconstructed from the same rotated DSA image, no displacement exists between B1 and C1. Steps ST3c and ST3e are therefore automatically skipped. (Information on the imaging apparatus used, the imaging time and the like are totally identical for each image).

The 3D-image processing apparatus 1 goes from Step ST3f to Step ST3c. In Step ST3c, the apparatus 1 calculates the displacement between image C1 and image D1. More precisely, it performs a threshold process, extracting only an image of the blood vessels from the image D1. Then, the apparatus 1 performs cross correlation on the 3D-DSA image C1 and the blood vessel image D2, finding a displacement vector of a minimum value. Assume that the shifts of (x2, y2, and z2) and the rotations of (Δθx2, Δθy2, and Δθz2) are required to align the image D1 with the image C1. Then, the 3D-image processing apparatus 1 goes from Step ST3d to Step ST3e. In Step ST3e, the storage unit 12 stores the displacement information. Note that Δθx2, Δθy2, and Δθz2 are rotations around the axes x, y and z, respectively.

The 3D-image processing apparatus 1 then proceeds from Step ST3f to Step ST3g. In Step ST3g, the affine transformation unit 15 corrects the displacement. To be more specific, displacement information about the images C1 and D1 is acquired from the storage unit 12. Shifts (x2, y2, and z2) and rotations (Δθx2, Δθy2, and Δθz2) are performed on the image D1, thus providing an image D2'.

Next, the 3D-image processing apparatus 1 corrects the displacement between the images C1 and B1. In this case, the displacement information about the images C1 and B1 should be acquired from the storage unit 12. The storage unit 12 holds no displace information about the image C1 or the image B1. This means that no displacement exists between the images C1 and B1. Hence, no displacement correction is performed.

Further, the 3D-image processing apparatus 1 corrects the displacement between the images B1 and A1. More precisely, the displace information about the images B1 and A1 is acquired from the storage unit 12. Shifts (x1, y1, and z1) and the rotations (Δθx1, Δθy1, and Δθz1) are performed on the images B1 and A1, thereby generating an image D3.

Figure 4:
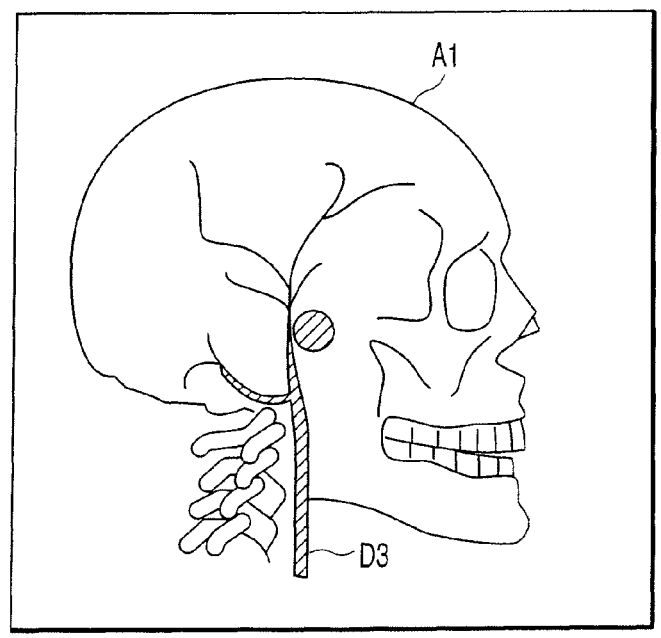
FIG. 4 is a diagram depicting a synthesized image obtained in the first embodiment.

Thereafter, the 3D-image processing apparatus 1 synthesizes the image A1 and the image D3 in a three-dimensional space. The display unit 17 displays such a synthesized image as shown in FIG. 4 (Step ST3h). The synthesized image displayed by the display unit 17 is a combination of, for example, image A1 of the skull and image D3 of the blood vessels.

Shadow information representing CT images of the bones, organs, tumors, etc. can thereby be synthesized with MRI functional information, providing a synthesized image. The synthesized image is displayed. The image is useful for the doctor who makes surgery planning before performing a surgical operation.

In the first embodiment described above, the 3D image processing apparatus 1 uses the mask 3D image data and the 3D-DSA image data to find the displacement between the 3D-CT image data and the MRI data, before synthesizing the 3D-CT image data with the MRI data. The apparatus 1 then synthesizes the CT image data with the MRI data in the 3D space, on the basis of the displacement thus found.

Hence, the 3D-CT image data can be automatically synthesized with the MRI data in accordance with the displacement information, requiring no manpower. Accurate diagnosis can therefore be made easily and reliably in a short time.

Since the display unit 17 displays a 3D synthesized image regarding the subject, doctors can understand various diagnostic results from the synthesized image. This helps them to make a surgery planning before they perform surgical operations.

Second Embodiment

Figure 5:
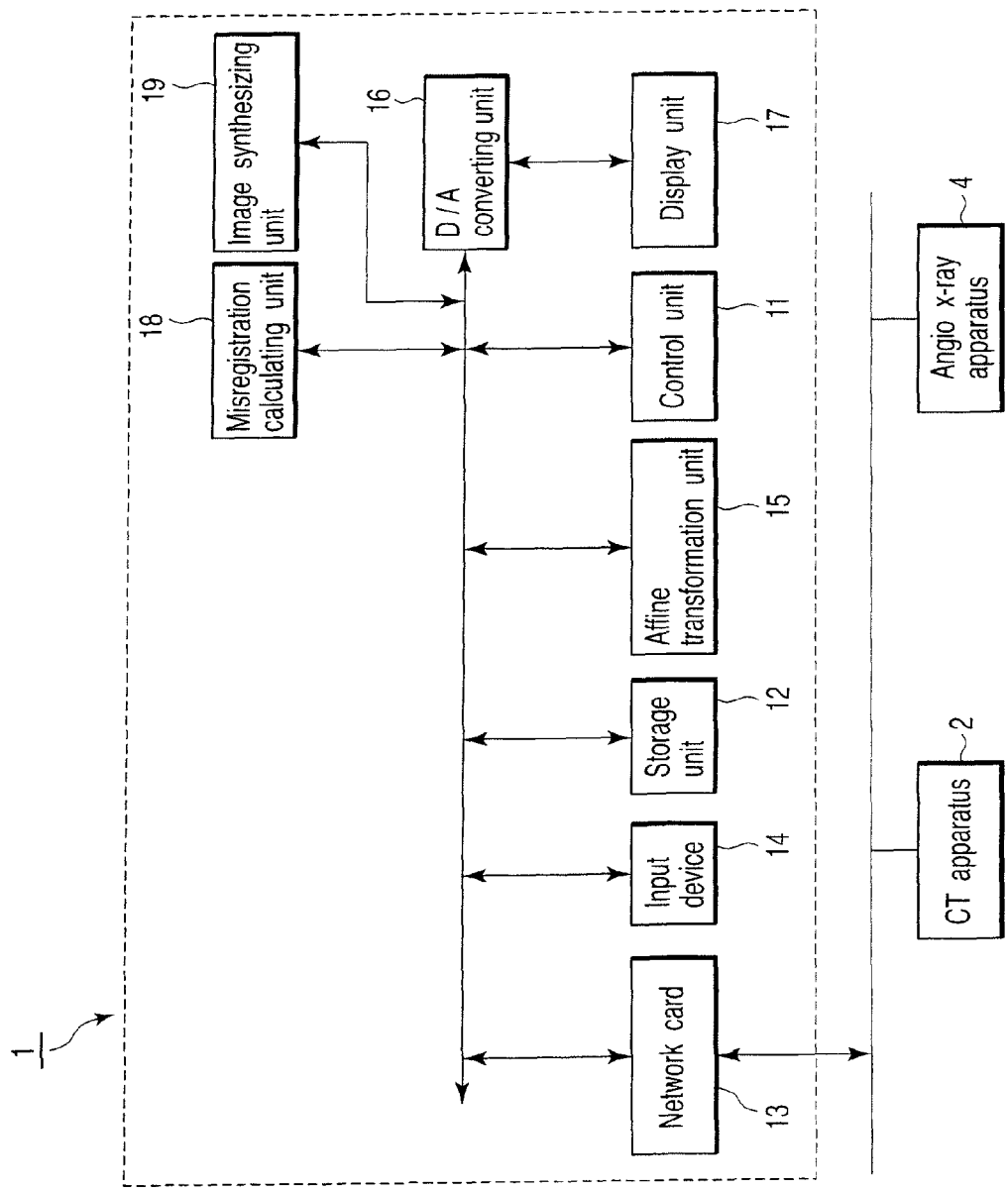
FIG. 5 is a block diagram showing a 3D-image processing apparatus that is a second embodiment of the present invention.

FIG. 5 is a block diagram showing a 3D-image processing apparatus that is a second embodiment of the present invention. As FIG. 5 shows, the 3D-image processing apparatus 1 is connected to a CT apparatus 2 and an angio-X-ray apparatus 4. The components shown in FIG. 5 and identical to those shown in FIG. 1 are designated at the same reference numbers. These components will not be described in detail.

In the 3D-image processing apparatus 1, the display unit 17 displays a 3D-CT image (A1), a mask 3D image (B1), and a 3D-DSA image (C1) stored in a storage unit 12. The user (operator) may push an [Indirect Fusion] button provided on the input device 14, selecting the images A1 and C1. Further, the user sets registration of the images B1 and A1 and registration of the images B1 and C1 (thus, drawing a relationship line on GUI). Then, the 3D-image processing apparatus 1 calculates the displacement between the images B1 and A1. More specifically, it performs a threshold process, extracting only images of the bones from the images B1 and A1. Then, it performs cross-correlation on a bone image B2 and a bone image A1, finding a displacement vector of a minimum value. Assume that shifts (x1, y1, and z1) and rotations of (Δθx1, Δθy1, and Δθz1) should be performed to align the image B1 with the image A1. Then, the storage unit 12 stores the displacement information.

Next, the 3D-image processing apparatus 1 calculates the displacement between the images C1 and B1. Since the image B1 and the image C1 are reconstructed from the same rotated DSA image, no displacement exists. Thus, the processing is automatically skipped. (They are totally identical in terms of imaging apparatus used, the imaging time, and the like).

Then, 3D-image processing apparatus 1 correct the displacement between the image C1 and the image B1. The displacement information about the images C1 and B1 must therefore be acquired from the storage unit 12. Sine the storage unit 12 stores no displacement information about the images C1 and B1, the processing is automatically skipped.

The 3D-image processing apparatus 1 then corrects the displacement between the images B1 and A1. More specifically, the displacement information about the images C1 and B1 is acquired from the storage unit 12. The apparatus 1 then performs shifting (x1, y1, and z1) and rotating (Δθx1, Δθy1, and Δθz1), on the image C1, generating an image C2.

Thereafter, the 3D-image processing apparatus 1 synthesizes the image A1 with the image C2 in a three-dimensional space, providing a synthesized image. The display unit 17 displays the synthesized image.

In the second embodiment described above, too, the CT shade information on the bones, internal organs, tumors, etc. and the detailed 3D angio information on the blood vessels can be synthesized, generating a synthesized image. The synthesized image is displayed. The image helps doctors to understand the relation the blood vessels have with the bones, organs and tumors.

Further, the second embodiment may be modified such that a threshold-value process is performed, extracting a bone portion. The bone part and blood-vessel part may be extracted from the image B1, soft tissues are extracted from the image A1, and the blood vessels are extracted from the image C1.

Third Embodiment

A third embodiment of the present invention is applied to computed-tomography angiography (CTA) that is a technique of injecting contrast medium into the veins by using the above-described CT apparatus 2. The third embodiment will be described with reference to FIG. 5.

The CT apparatus 2 collects 3D-CTA images of the arteries and veins, at an arbitrary region in the subject. The apparatus 2 reconstructs the images, generating 3D-CTA image data. The 3D-CTA image data is transmitted to a 3D-image processing apparatus 1 and stored in a storage unit 12.

That is, in the 3D-image processing apparatus 1, the display unit 17 displays a 3D-CTA image (A1), a mask 3D image (B1) and a 3D-DSA image (C1), all stored in the storage unit 12. In this state, the user (operator) may push an [Indirect Fusion] button provided on the input device 14, selecting the images A1 and C1 that are fusion target images. The user may further set the registration of the image B1 with the image A1 and the registration of the image B1 with the image C1 (drawing a line of relationship on GUI). The apparatus 1 then calculates the displacement between the image B1 and the image A1. More specifically, the apparatus 1 extracts only the bone by performing a threshold process on the image B1 and the image A1. The apparatus 1 also performs cross-correlation calculation by a bone image A2 and a bone image B2 obtained by the threshold value processing to find displacement vector in which that calculation value becomes the minimum. To align the image B1 with the image A1 in position, the shifts (x1, y1, and z1) and the rotations of ($\Delta\theta x1$, $\Delta\theta y1$, and $\Delta\theta z1$) are required. In the 3D image processing apparatus 1, the storage unit 12 stores the displacement information.

Next, the 3D image processing apparatus 1 calculates the displacement between the image B1 and the image C1. The images B1 and C1 have been reconstructed from the same rotation DSA image, they are not displaced from each other. The process of calculating the displacement is automatically skipped. (These images are totally identical in terms of the imaging apparatus used, the imaging time, and the like.) Since the storage unit 12 stores no displacement information about the images C1 and B1, the process is automatically skipped.

Further, the 3D image processing apparatus 1 corrects the displacement between the images B1 and A1. More precisely, displacement data about the images B1 and A1 is acquired from the storage unit 12. Then, the apparatus 1 performs shifts (x1, y1, and z1) and rotations ($\Delta\theta x1$, $\Delta\theta y1$, and $\Delta\theta z1$), generating an image C2.

Thereafter, the 3D image processing apparatus 1 synthesizes the image A1 and the image C2 in a three-dimensional space, providing a synthesized image. The display unit 17 displays the synthesized image. At this time, in the blood vessels of CTA and 3D-DSA overlap at some parts and do not overlap at the other parts. CTA shows the images of all arteries and the images of all veins. But, 3D-DSA shows the images of the veins only. Therefore, the arteries overlapping are displayed in one color, and the arteries not overlapping are display in another color.

Thus, the positional relationship between the arteries and the veins can be clearly presented in the third embodiment described above.

Fourth Embodiment

Figure 6:
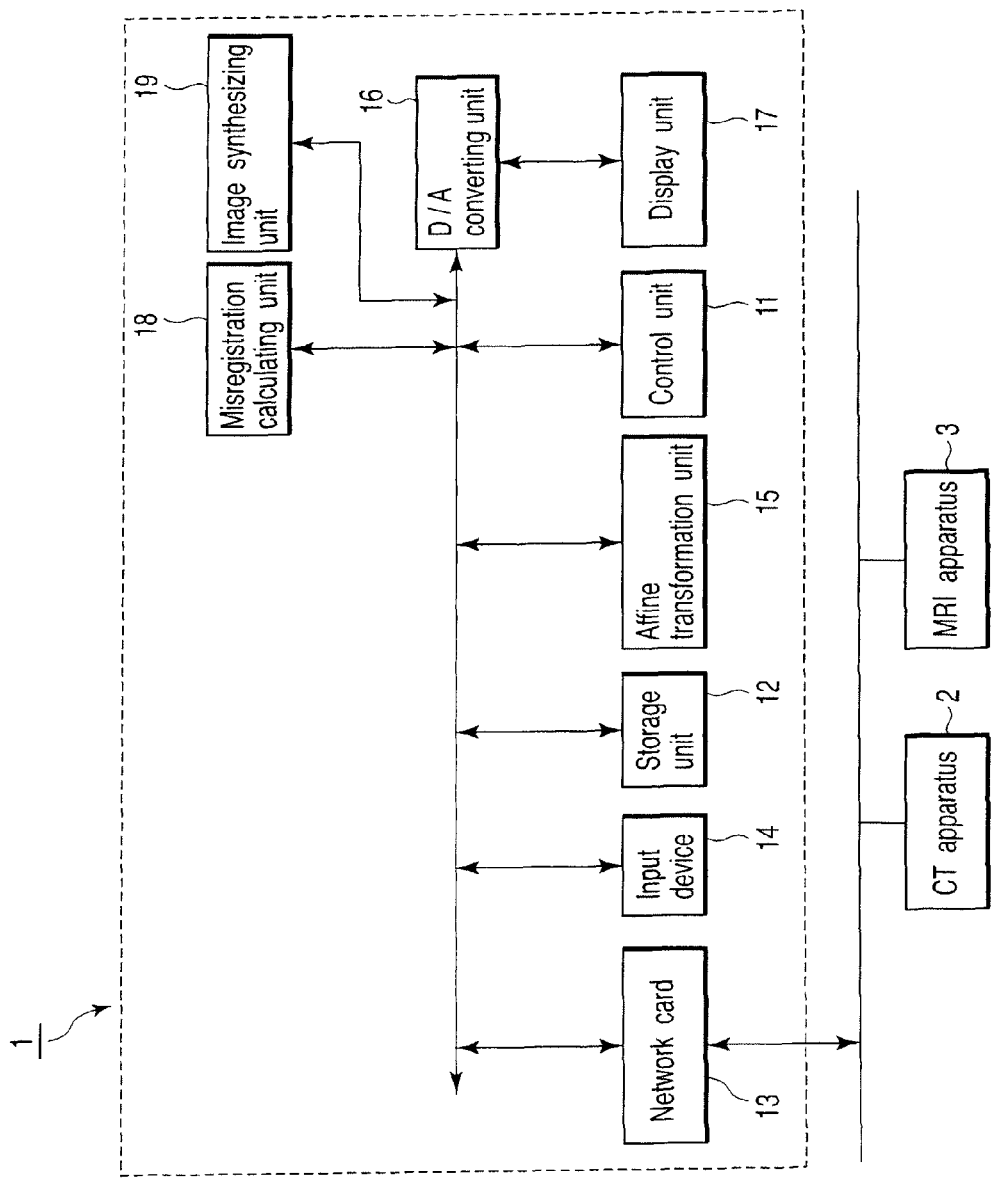
FIG. 6 is a block diagram showing a 3D-image processing apparatus that is a fourth embodiment of the present invention.

FIG. 6 is a block diagram showing a fourth embodiment of the 3D image processing apparatus of the present invention. As FIG. 6 shows, this 3D image processing apparatus 1 is connected to a CT apparatus 2 and an MRI apparatus 3. The components shown in FIG. 6 and identical to those shown in FIG. 1 are designated at the same reference numbers in FIG. 6, and will not be described in detail.

The CT apparatus 2 collects and reconstructs the 3D-CT images of an arbitrary region in a subject, generating 3D-CT image data. The 3D-CT image data is transmitted to the 3D image processing apparatus 1. In the apparatus 1, the data is stored in the storage unit 12.

The MRI apparatus 3 collects and reconstructs two types of 3D MRI images of an arbitrary region in the subject. One reconstructed MRI image is an image (e.g., TI weighted image) from which the anatomical data can easily be obtained. The other reconstructed MRI image is an image that has functional diagnostic data. (The other reconstructed MRI image is a T2-weighted image from which legion can be easily detected or a DWI, functional MRI or perfusion MRI image that presents functional diagnostic data.) The 3D MRI image data generated by the MRI apparatus 3 is transmitted to the 3D image processing apparatus 1. In the apparatus 1, the MRI image data is stored in the storage unit 12.

The 3D image processing apparatus 1 starts a control shown in FIG. 3. In Step ST3a, the display 17 displays the 3D-CT image (image A1), the MRI image (image B1) presenting anatomical data and an MRI image (image C1) presenting functional data, all stored in the storage unit 12. The user (operator) may operates the [Indirect Fusion] button provided on an input device 14, selecting the images A1 and C1 being fusion target images, and may further set the registration of the image B1 with the image A1 and the registration of the image B1 with the image C1 (drawing a line of relationship on GUI). The apparatus 1 then goes from Step ST3b to Step ST3c. In Step ST3c, the apparatus 1 finds the displacement between B1 and A1. More specifically, an image of the brain is extracted from B1 and A1, and cross-correlation calculation is performed on B2 and A2, and a displacement vector is obtained, in which that value found in the cross-correlation calculation is minimal. Assume that shifts (x1, y1, and z1) and rotations ($\Delta\theta x1$, $\Delta\theta y1$, and $\Delta\theta z1$) should be performed to align images B2 and A2. In this case, the 3D image processing apparatus 1 goes from Step ST3d to Step ST3e. In Step ST3e, the storage unit 12 stores the displacement information. Note that $\Delta\theta x2$, $\Delta\theta y2$, and $\Delta\theta z2$ are rotations around the axes x, y and z, respectively.

It is more difficult to extract an image of the brain than to extract an image of the skull. The process of extracting the imager of the brain will be briefly explained. First, a process called "bone removal" is performed. The bone removal is a technique well known in the field of CT technology. The position of the bone to be removed identified with a CT value, and the image of the bone and the image of the soft tissue surrounding the bone are extracted. Second, the image of the skull is cut at the base by manual operation, and the image of the brain is extracted. To extract the image of the brain from the image B1, the image of the skull is cut at the base, the brain is designated, and only the image of the brain (including the hard membrane) is extracted by the region-growing method. The 3D images thus extracted are subjected to high-frequency filtering. The result of the filtering is multiplied by a probability functional determined by a voxel value. Images B2 and A2 are thereby formed. Image A2 is obtained as follows.

$$A_2(x,y,z) = \{A_e(x,y,z) * H(x,y,z)\} \times p\{A_e(x,y,z)\}$$

where $A_2(x,y,z)$ is data acquired by extracting the brain image by manual operation, $H(x,y,z)$ is the high-frequency filter, * is a convolution operator, and P( ) is the probability functional. The probability functional represents the probability that a given CT value represents the brain. The probability functional is 0 if the CT value is −1000 or 1000, is 1 if the CT value is 10 to 20, or at the brain level, and is close to 1 if the CT value is a little smaller than 10 or a little greater than 20. The smaller the functional is than 10, or the greater the functional is than 20, the more rapidly the functional approaches 0.

Next, the 3D-image processing apparatus 1 determines whether any image to be processed exists or not (Step ST3f). Since images C1 and B1 exist, the apparatus 1 proceeds to Step ST3c. In Step ST3c, the displacement between C1 and B1 is calculated. The images C1 and B1 have been collected and reconstructed by the same apparatus, i.e., MRI apparatus 3. Therefore, C1 and B1 are not displaced from each other (that is, they are identical in terms of the imaging apparatus, the imaging time and the like). Hence, Step ST3c is skipped.

Then, the 3D-image processing apparatus 1 corrects the displacement between the images C1 and B1. That is, the displacement information about the images C1 and B1 is acquired from the storage unit 12. Since the unit 12 stores no displacement information about these images, the images C1 and B1 are considered not displaced at all. The displacement correction is therefore skipped.

The 3D-image processing apparatus 1 then corrects the displacement between the 3D images B1 and A1. That is, the displacement information about the images B1 and A1 is acquired from the storage unit 12. Then, shifts (x1, y1, and z1) and rotations ($\Delta\theta x1$, $\Delta\theta y1$, and $\Delta\theta z1$) are performed first on the image C1, generating image C2.

Thereafter, the 3D-image processing apparatus 1 synthesizes the images A1 and C2 in a three-dimensional space, providing a synthesized image. The display unit 17 displays the synthesized image. The images A1 and C2 may be synthesized, first by displaying the CT image and the MRI image in gray scale and color, respectively, and then by combining these images, thereby forming a 3D image or a tomogram. Alternatively, they may not be combined directly. Instead, they may be first displayed these two images side by side. As one tomogram is moved, the other tomogram is moved, too. Further, as a specific position in one tomogram is pointed, the corresponding position in the other tomogram is pointed, too. Thus, doctors can make a diagnosis from the CT structural information about bones, organs, tumors, etc., which is associated with the MRI functional information. This helps them to make a surgery planning before they perform surgical operations.

Fifth Embodiment

A fifth embodiment of the present invention will be described with reference FIG. 6, too.

The CT apparatus 2 collects and reconstructs 3D-CAT images of an arbitrary region in a subject the A, generating 3D-image data, while a contrast medium is being injected into the veins. The 3D image data is transmitted to the 3D-image processing apparatus 1. In the apparatus 1, the storage unit 12 stores the 3D image data.

The MRI apparatus 3 collects and reconstructs two types of 3D MRI images of an arbitrary region in the subject. One reconstructed MRI image is an image in which the blood vessels are weighted. The other reconstructed MRI image is an image that has functional diagnostic data. (The other reconstructed MRI image is a T2-weighted image from which legion can be easily detected or a DWI, functional MRI or perfusion MRI image that presents functional diagnostic data.) The 3D MRI image data generated by the MRI apparatus 3 is transmitted to the 3D image processing apparatus 1. In the apparatus 1, the MRI image data is stored in the storage unit 12.

The 3D image processing apparatus 1 starts a control shown in FIG. 3. In Step ST3a, the display 17 displays the 3D-CT image (image A1), the MRI image (image B1) presenting anatomical data and an MRI image (image C1) presenting functional data, all stored in the storage unit 12. The user (operator) may operates the [Indirect Fusion] button provided on an input device 14, selecting the images A1 and C1 being fusion target images, and may further set the registration of the image B1 with the image A1 and the registration of the image B1 with the image C1 (drawing a line of relationship on GUI). The apparatus 1 then goes from Step ST3b to Step ST3c. In Step ST3c, the apparatus 1 finds the displacement between B1 and A1. More specifically, an image of the brain is extracted from B1 and A1, and cross-correlation calculation is performed on B2 and A2, and a displacement vector is obtained, in which that value found in the cross-correlation calculation is minimal. Assume that shifts (x1, y1, and z1) and rotations ($\Delta\theta x1$, $\Delta\theta y1$, and $\Delta\theta z1$) should be performed to align images B2 and A2. Then, the 3D image processing apparatus 1 goes from Step ST3d to Step ST3e. In Step ST3e, the storage unit 12 stores the displacement information. Note that $\Delta\theta x2$, $\Delta\theta y2$, and $\Delta\theta z2$ are the rotations around the axes x, y and z, respectively.

Next, the 3D-image processing apparatus 1 determines whether any image to be processed exists or not (Step ST3f). Since images C1 and B1 exist, the apparatus 1 proceeds to Step ST3c. In Step ST3c, the displacement between C1 and B1 is calculated. The images C1 and B1 have been collected and reconstructed by the same apparatus, i.e., MRI apparatus 3. Therefore, C1 and B1 are not displaced from each other (that is, they are identical in terms of the imaging apparatus used, the inspection ID, and the like).

Then, the 3D-image processing apparatus 1 corrects the displacement between the images C1 and B1. More precisely, the displacement information about the images C1 and B1 is acquired from the storage unit 12. Since the unit 12 stores no displacement information about these images, the images C1 and B1 are considered not displaced at all. The displacement correction is therefore skipped.

The 3D-image processing apparatus 1 then corrects the displacement between the 3D images B1 and A1. That is, the displacement information about the images B1 and A1 is acquired from the storage unit 12. Then, shifts (x1, y1, and z1) and rotations ($\Delta\theta x1$, $\Delta\theta y1$, and $\Delta\theta z1$) are performed first on the image C1, generating image C2.

Thereafter, the 3D-image processing apparatus 1 synthesizes the images A1 and C2 in a three-dimensional space, providing a synthesized image. The display unit 17 displays the synthesized image. The images A1 and C2 may be synthesized, first by displaying the CT image and the MRI image in gray scale and color, respectively, and then by combining these images, thereby forming a 3D image or a tomogram. Alternatively, they may not be combined directly. Instead, they may be first displayed these two images side by side. As one tomogram is moved, the other tomogram is moved, too. Further, as a specific position in one tomogram is pointed, the corresponding position in the other tomogram is pointed, too. Thus, doctors can make a diagnosis from the CT structural information about bones, organs, tumors, etc., which is associated with the MRI functional information. This helps them to make a surgery planning before they perform surgical operations.

Sixth Embodiment

Figure 7:
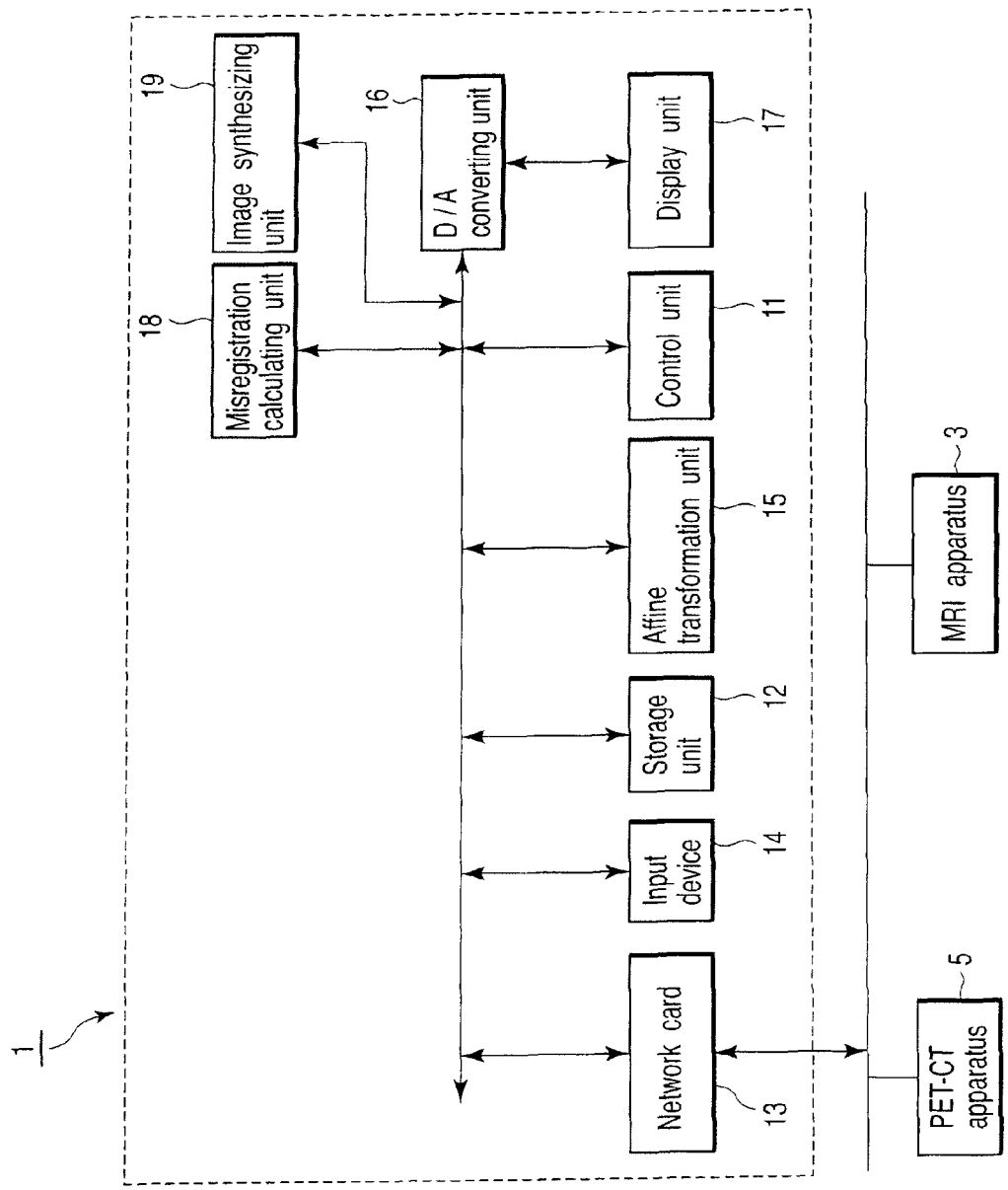
FIG. 7 is a block diagram showing a 3D-image processing apparatus that is a fifth embodiment of the present invention.
Figure 8:
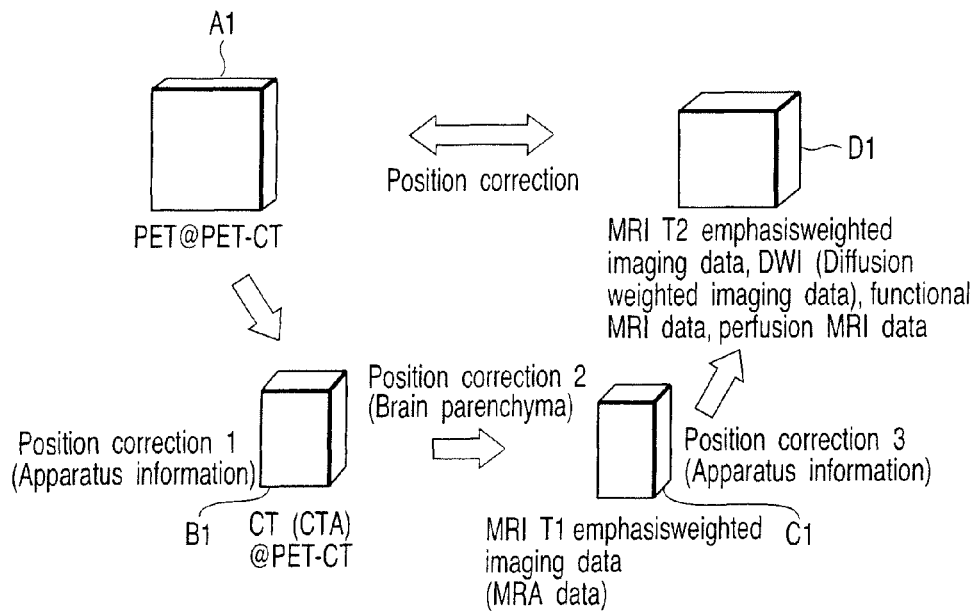
FIG. 8 is a diagram explaining how various images are processed to synthesize PET-CT image data with perfusion MRI image data in the sixth embodiment.

FIG. 7 is a block diagram showing a sixth embodiment of the 3D-image processing apparatus of the present invention. An MIR apparatus 3 and a position emission tomography (PET)-CT apparatus 5 are connected to the 3D-image according to this embodiment. The components identical to those shown in FIG. 1 are designated at the same reference numbers in FIG. 7, and will not be described in detail.

The PET-CT apparatus 5 superposes functional image information obtained by PET inspection conducting a diagnosis of malignant tumors on morphological information. The 3D PET image data obtained by this PET-CT apparatus 5 and the CTA image data photographed and reconstructed while a contrast medium is being injected into the veins are transmitted to the 3D-image processing apparatus 1 and stored in a storage unit 12 provided in the apparatus 1.

Further, the MRI apparatus 3 collects and reconstructs the 3D magnetic resonance angiography (MRA) image of an arbitrary region in the subject regarding the arteries and veins. The reconstructed 3D MRA (MR angiography) image data and the 3D MRI data are transmitted to the 3D-image processing apparatus 1 and stored in the storage unit 12.

That is, in the 3D-image processing apparatus 1C of FIG. 7, the display unit 17 displays a 3D PET image (A1), a 3D-CTA image (B1), a 3D-MRA image (C1), and a functional image (e.g., blood-flow (Perfusion) MRI image (D1), all stored in the storage unit 12. In this state, the user (operator) may operate an [Indirect Fusion] button provided on the input device 14, selecting the image A1 and the image D1, both being Fusion target images. The operator may further set registration of the images A1 and the image B1, registration of the image B1 and the image C1, and registration with the C1 and the D1 (draws a line of relationship on GUI). Then, the 3D-image processing apparatus 1 calculates the displacement between the image A1 and the image B1. In this case, the images A1 and B1 have been collected and reconstructed by the same apparatus, i.e., PET-CT apparatus. Hence, they are not displaced from each other. The process of calculating the displacement is automatically skipped. (This is because, the images are identical in terms of the imaging apparatus used, the inspection ID, and the like.)

Next, the 3D-image processing apparatus 1 finds the displacement between the image B1 and the image C1. More specifically, the apparatus 1 extracts the images of blood vessels from the images B1 and C1, and performs the cross-correlation calculation on the image B1 and C1, finding a displacement vector of the minimum value. The displacement information is in the storage unit 12.

Subsequently, the 3D-image processing apparatus 1 calculates the displacement between the image C1 and the image D1. In this case, the images C1 and D1 have been collected and reconstructed by the same apparatus, i.e., MRI apparatus 2, and are not displaced from each other. The process of calculating the displacement is therefore automatically skipped. (That is, the images are identical in terms of the imaging apparatus used, the inspection ID, and the like.).

Next, the 3D-image processing apparatus 1 corrects the displacement between the image D1 and the image C1. To be more specific, the displacement information about the images D1 and C1 is acquired from the storage unit 12. Since there is no displacement information about these images, it is determined that no displacement exists. Hence, the process of correcting the displacement is skipped.

The 3D-image processing apparatus 1 then collects the displacement between the image C1 and the image B1. More precisely, the displacement information about the images C1 and B1 is acquired from the storage unit 12. Using the displacement information, the apparatus 1 correct the displacement of the image D1, thereby generating an image D2.

Further, the 3D-image processing apparatus 1 corrects the displacement between the image B1 and the image A1. That is, the displacement information about the images B1 and A1 is acquired from the storage unit 12. Since there is no displacement information about these images, it is determined that these images are not displaced. Hence, the process of correcting displacement is skipped.

After that, based on total pieces of displacement information stored in the storage unit 12, the 3D-image processing apparatus 1 synthesizes the image A1 with the image D2, and, if necessary, with the image B1, in a three-dimensional space. The display unit 17 displays the resulting synthesized image.

In the sixth embodiment described above, the 3D-image processing apparatus 1 finds the displacement between a 3D-PET-CD image data and the functional data on the basis of the 3D-CTA image data and the 3D-MRA image data, before synthesizing the 3D-PET-CD image data and the functional data. Based on the displacement information, the apparatus 1 synthesizes the 3D-CTA image data and the 3D-MRA image data. (The functional data is, for example, T2-weighted image (MRI T2 weighted imaging data) from which legion can be easily detected, or a DWI (diffusion-weighted imaging data), functional MRI or perfusion MRI image that presents functional diagnostic data.)

In this embodiment, the image B1 is a 3D-CTA image, and the image C1 is a 3D-MRA image. Instead, the image B1 may be a 3D-CT image, and the image C1 may be an image from which anatomical information can easily acquired (e.g., an MRI TI weighted imaging data).

Hence, the diagnostic information on the malignant tumors and the like obtained by the PET-CT apparatus 5 and the blood-flow information by MRI can be synthesized, and a resulting synthesized image can be displayed. This is useful, for example, for forming a plan when performing the surgical operation.

Seventh Embodiment

A seventh embodiment of the present invention is configured to synthesize and process blood-flow CT image data and blood-flow MRI data by using the above-described CT apparatus 2.

Figure 9:
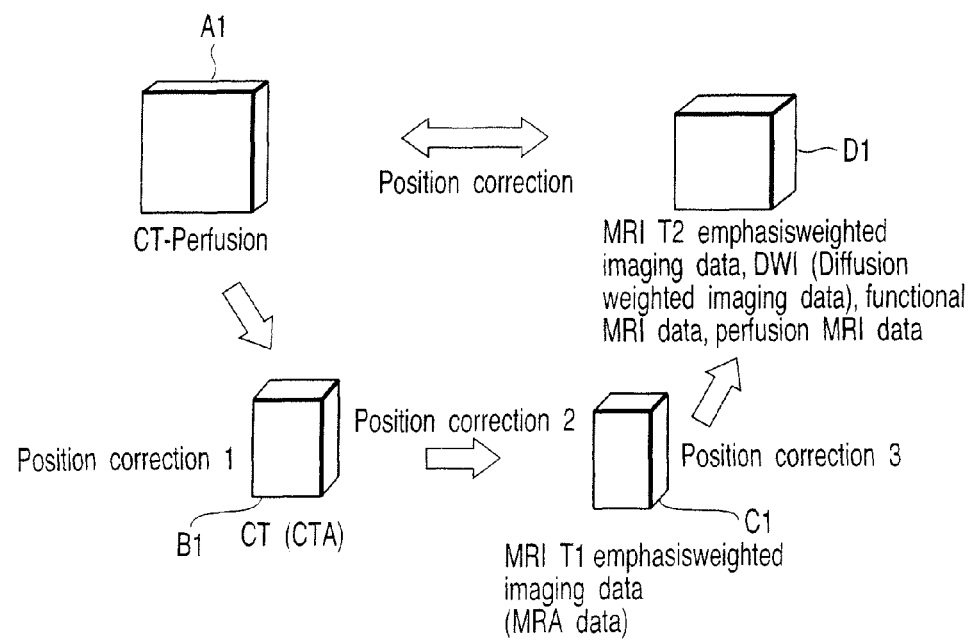
FIG. 9 is a diagram explaining how various images are processed to synthesize PET-CT image data with perfusion MRI image data in a seventh embodiment of the present invention.

That is, In the 3D-image processing apparatus 1 shown in FIG. 9, the display unit 17 displays a 3D blood-flow CT image (A1), a 3D CTA image (B1), a 3D-MRA image (C1), and functional data (D1), stored in the storage unit 12.

In this state, the user (operator) may push the [Indirect Fusion] button provided on the input device 14, selecting the images A1 and D1, i.e., Fusion target images, and further setting registration of the images B1 and C1 and registration of the images C1 and d1 (drawing a line of relationship on GUI). Then, the 3D-image processing apparatus 1 calculate the displacement between the image A1 and the image B1. Since the images A1 and B1 have been collected and reconstructed by the same apparatus, i.e., CT apparatus 2, they are not displaced from each other (they are totally identical in terms of the imaging apparatus used, the inspection ID, and the like).

Next, the 3D-image processing apparatus 1 calculates the displacement between the image B1 and the image C1. More specifically, the apparatus 1 extracts images of the blood vessels from the image B1 and C1 and performs cross-correlation on the blood-vessel images, finding a displacement vector of the minimum value. The displacement information is in the storage unit 12.

Subsequently, the 3D-image processing apparatus 1 calculates the displacement between the image C1 and the image D1. In this case, the images C1 and D1 have been collected and reconstructed by the same apparatus, i.e., MRI apparatus 2, and are not displaced from each other. The process of calculating the displacement is therefore automatically skipped. (That is, the images are identical in terms of the imaging apparatus used, the inspection ID, and the like.).

Next, the 3D-image processing apparatus 1 corrects the displacement between the image D1 and the image C1. To be more specific, the displacement information about the images D1 and C1 is acquired from the storage unit 12. Since there is no displacement information about these images, it is determined that no displacement exists. Hence, the process of correcting the displacement is skipped.

The 3D-image processing apparatus 1 then collects the displacement between the image C1 and the image B1. More precisely, the displacement information about the images C1 and B1 is acquired from the storage unit 12. Using the displacement information, the apparatus 1 correct the displacement of the image D1, thereby generating an image D2.

Further, the 3D-image processing apparatus 1 corrects the displacement between the image B1 and the image A1. That is, the displacement information about the images B1 and A1 is acquired from the storage unit 12. Since there is no displacement information about these images, it is determined that these images are not displaced. Hence, the process of correcting displacement is skipped.

Thereafter, the 3D-image processing apparatus 1 synthesizes the image A1 with the image D2 and, if necessary, with the image B1, in a three-dimensional space, on the basis of total pieces of displacement information stored in the storage unit 12. The display unit 17 displays the resulting synthesized image.

In the seventh embodiment described above, the 3D-image processing apparatus 1 uses the 3D-CTA image data and the 3D-MRA image data, finding the displacement between the 3D-CT blood-flow image data and the 3D-MRA blood-flow image data, before synthesizing the 3D blood-flow CT image data and the functional data. The apparatus 1 synthesizes images in a three-dimensional space, on the basis of the information representing the displacement thus found.

In this embodiment, the image B1 is a 3D-CTA image, and the image C1 is a 3D-MRA image. Instead, the image B1 may be a 3D-CT image, and the image C1 may be an image from which anatomical information can easily acquired (e.g., an MRI TI weighted image).

Thus, the blood-flow information by CT and the blood-flow information by MRI can be synthesized, and a resulting synthesized image can be displayed. This is useful, for example, for forming a plan when performing the surgical operation.

Various embodiments of the present invention have been described. Nevertheless, the present invention is not limited to the embodiments described above. The components of any embodiment can be modified in various manners in reducing the invention to practice, without departing from the sprit or scope of the invention. Further, the components of the embodiments described above may be combined, if necessary, to make different inventions. For example, some of the component of any embodiment may not be used.

Eighth Embodiment

Figure 10:
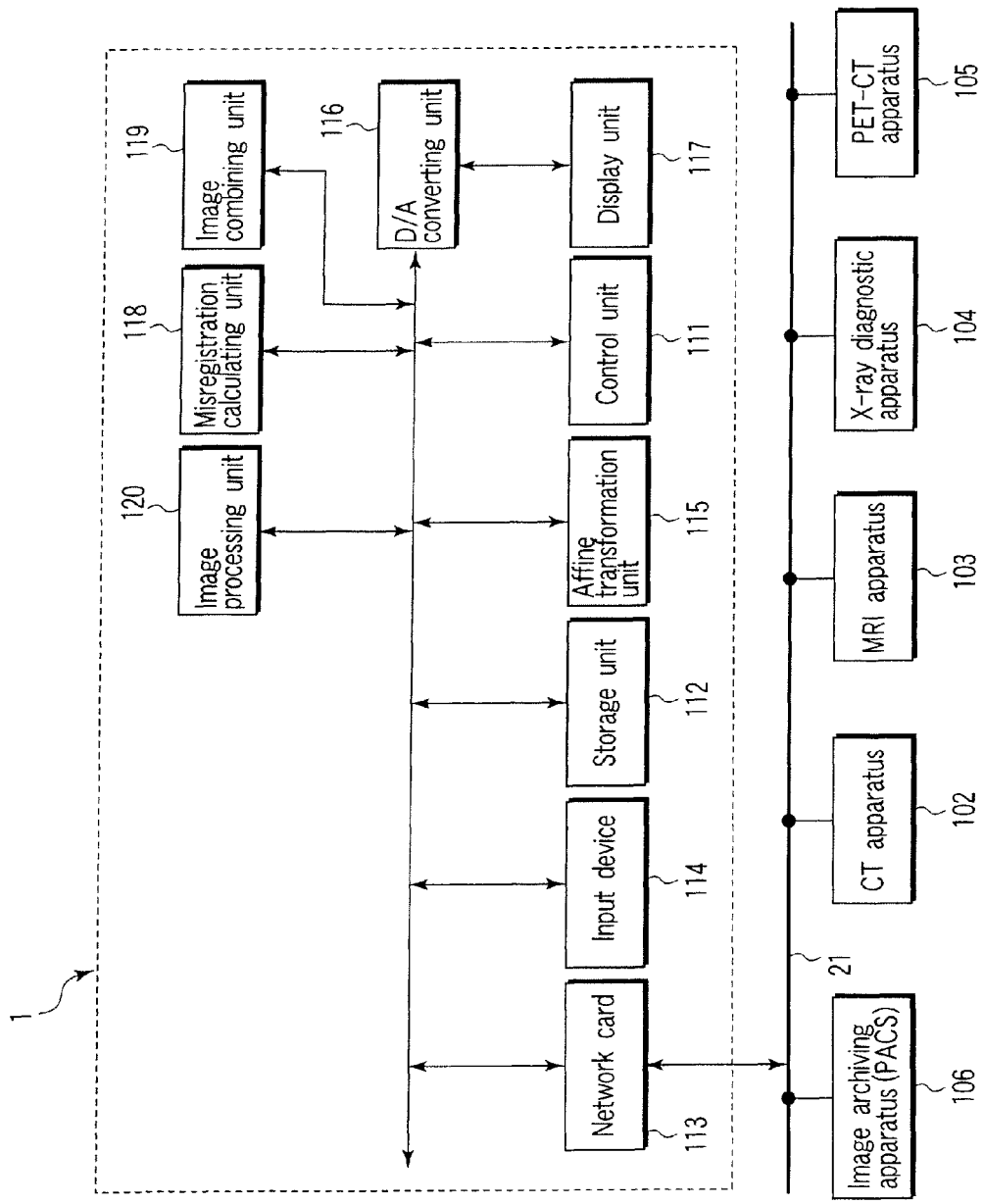
FIG. 10 is a block diagram showing the arrangement of a 3D-image processing apparatus according to the eighth embodiment of the present invention.

FIG. 10 shows the arrangement of a 3D-image processing apparatus according to the eighth embodiment. A 3D-image processing apparatus 101 connects to an electronic communication network, i.e., a network 121 such as a LAN or WAN, through a network card 113. Medical image generators which can generate 2D- or 3D-image data, e.g., an X-ray computed tomography apparatus (X-ray CT apparatus) 102, a magnetic resonance imaging apparatus (MRI) 103, an X-ray diagnostic apparatus 104, a PET-CT apparatus 105, and an ultrasonic diagnostic apparatus, connect to the network 121. In addition, an image archiving apparatus 106 which archives various kinds of image data generated by these medical image generators connects to the network 121. The image archiving apparatus 106 is typically a medical picture archiving and communication system (PACS). The PET-CT apparatus 105 is an apparatus obtained by integrally combining a PET (Positron Emission computed Tomography) apparatus and an X-ray CT apparatus so as to share a bed. This apparatus has a merit of easily achieving positional matching between a PET image and a CT image.

The 3D-image processing apparatus 101 includes a control unit 111 comprising a microcomputer, a storage unit 112, the network card 113, an input device 114 comprising a keyboard and a mouse, an affine transformation unit 115 which performs processing such as enlargement/movement for image data, a D/A (digital/analog) converting unit 116, a display unit 117, a misregistration calculating unit 118, an image combining unit 119, and an image processing unit 120. The display unit 117 connects to the D/A converting unit 116. Note that the 3D-image processing apparatus 101 may include the image archiving apparatus 106 together with the control unit 111 and the like.

The storage unit 112 stores the data of a plurality of 3D images (to be referred to as combining target images) which are supplied directly from a medical image generator such as the X-ray CT apparatus 102 or supplied from the image archiving apparatus 106 through the network card 113 to be combined, and the data of at least one 3D image (to be referred to as a mediation image) which mediates registration between combining target images. It suffices to combine a plurality of 3D images or two (a pair) of 3D images. In this case, assume that the apparatus combines two (a pair) 3D images.

An image processing unit 120 is in charge of, for example, color processing as postprocessing for, for example, binarization processing and image combining of image data as preprocessing for misregistration calculation. The misregistration calculating unit 118 calculates a misregistration vector between combining target images by inserting a mediation image between the combining target images. A misregistration vector is defined by a moving distance associated with each of the X-, Y-, and Z-axes and a rotational angle associated with each of the X-, Y-, and Z-axes. The image combining unit 119 combines the two combining target images on the basis of the misregistration vector calculated by the misregistration calculating unit 118, and generates a single combined image.

Figure 11:
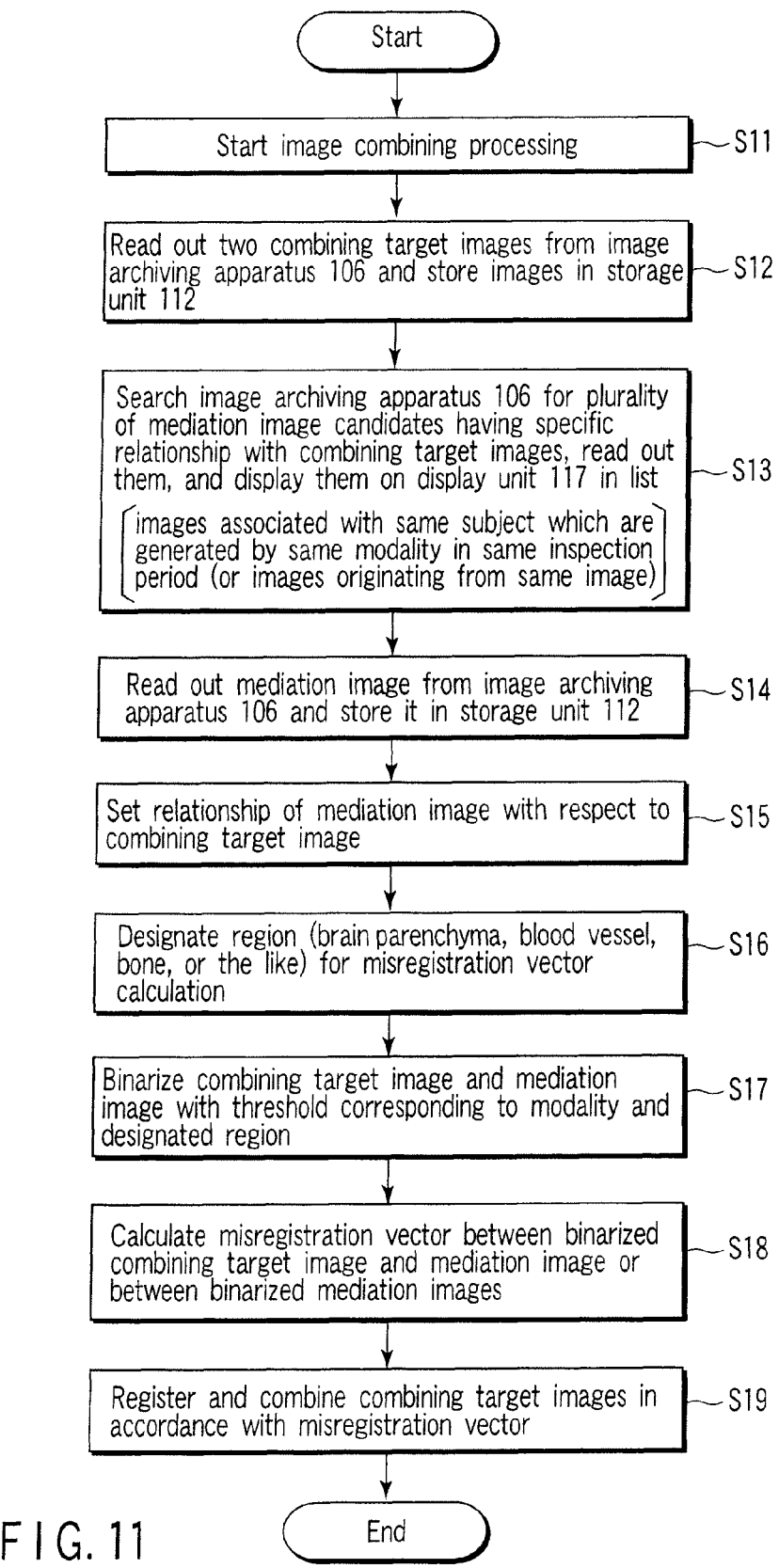
FIG. 11 is a flowchart showing a processing procedure for misregistration vector calculation and image combining according to the eighth embodiment.

FIG. 11 shows a processing procedure for misregistration calculation and image combining. First of all, the operator instructs to start image combining processing through the input device 114. In response to this instruction, the control unit 111 starts image combining processing (S11). The operator designates a plurality (two in this case) of combining target images which are targets for image combining processing through the input device 114. Typically, the operator designates uninterpreted images which are associated with a diagnosis target subject and have characteristics matching a diagnosis purpose. With this operation, the control unit 111 selectively reads out the data of the two designated combining target images from the image archiving apparatus 106, and makes the storage unit 112 store them (S12).

The control unit 111 then searches the image archiving apparatus 106 for two images (mediation image candidates) having a specific relationship with each of the combining target images, selectively reads out them from the image archiving apparatus 106, and makes the display unit 117 display them in the form of a list (S13). The control unit 111 searches for, as mediation image candidates, images which are associated with the same subject as that of the combining target images and generated (imaged) by the type (modality) of medical image generator in the same inspection period. In addition, the control unit 111 searches for, as mediation image candidates, images originating from the same original image as that of the combining target images. Assume that a mask image before the injection of a contrast medium and a contrast image after the injection of the contrast medium are acquired as original images in rotational DSA (digital subtraction angiography), and a 3D blood vessel image reconstructed from a difference image between the mask image and the contrast image is designated as a combining target image. In this case, a 3D mask image reconstructed by extracting a bone from the same mask image is selected as a mediation image candidate.

As described above, any of mediation image candidates having a specific relationship with an combining target image can be defined as an image which has no or almost no misregistration with respect to the combining target image or has a relationship that allows easy elimination of a misregistration from imaging position information such as the top position acquired by the medical image generator at the time of imaging.

Assume that the operator selects an anatomical image (morphological image) and a functional image as two combining target images. In this case, since there is no common region between the images, any misregistration cannot be essentially obtained or the misregistration calculation accuracy is low. Even in this case, inserting an anatomical image having no misregistration with the combining target image as a mediation image between the combining target images makes it possible to estimate the misregistration between them. That is, obtaining the misregistration between the mediation image, which has no misregistration with one of the combining target images or can easily eliminate the misregistration, and the other combining target image to be combined with the combining target image can essentially eliminate the misregistration between the combining target images in accordance with the obtained misregistration. Alternatively, obtaining the misregistration between a mediation image which has no misregistration with one of the combining target images or can easily eliminate the misregistration and a mediation image which has no misregistration with the other combining target image or can easily eliminate the misregistration makes it possible to essentially eliminate the misregistration between the combining target images in accordance with the obtained misregistration.

The operator designates desired images as mediation images from the mediation image candidates displayed in the list through the input device 114. With this operation, the control unit 111 selectively reads out the data of the designated mediation images from the image archiving apparatus 106 and stores the data in the storage unit 112 (S14). Note that the operator may designate one mediation image for each of a plurality of combining target images or may designate one mediation image for some or one of a plurality of combining target images.

While designating mediation images, the operator designates, as information indicating the relationships between the combining target images and the mediation images, information indicating which mediation image corresponds to which combining target image, information indicating whether there is no or almost no misregistration between a given combining target image and a corresponding mediation image, information indicating whether the misregistration between a given target image and a corresponding mediation image can be eliminated from apparatus information, information indicating the specific misregistration between specific images (between a combining target image and a mediation image or between mediation images) from which the misregistration between the combining target images is estimated, and the like. With this operation, the control unit 111 can set the corresponding relationship, a target for misregistration processing, and a processing procedure (S15).

When the operator designates a target region for misregistration vector calculation processing from a plurality of candidates which allow relatively easy area extraction processing, e.g., a brain parenchyma, blood vessel, and bone, through the input device 114 (S16), the image processing unit 120 extracts the area of the designated region from the combining target images and mediation images, which have been designated as the targets for misregistration calculation processing in step S15, with the threshold predetermined in accordance with each modality and region, and binarizes the area (S17). Localizing misregistration vector calculation processing to an arbitrary region and normalizing pixel values by binarization in this manner can decrease the number of steps in misregistration vector calculation processing. This can also improve the misregistration vector calculation accuracy.

It is more difficult to extract an image of the brain parenchyma than to extract an image of a bone. The process of extracting the image of the brain parenchyma will be briefly explained. First, a bone removal process is performed in a process for extracting the brain parenchyma from an image A1. Bone removal is a technique well known in the field of CT technology. More specifically, the position of a bone identified with a CT value, and the image of the bone and the image of the soft tissue surrounding the bone are eliminated. Second, the image of the skull is cut at the base by manual operation to extract only the image of the brain parenchyma. In the process of extracting the image of the brain parenchyma from an image B1, first, the image of the skull is cut at the base. Second, the brain is designated, and only the image of the brain parenchyma (including the hard membrane) is extracted by the region-growing method. The 3D images thus extracted are subjected to high-frequency enhancement filtering. The result of the filtering is multiplied by a probability functional determined by a voxel value, thereby generating images B2 and A2. The following calculation is performed for the image A2.

$$A_2(x,y,z)=\{A_e(x,y,z)*H(x,y,z)\}\times P\{A_e(x,y,z)\}$$

where $A_e(x, y, z)$ is the data acquired by extracting the image of the brain parenchyma by manual operation, $H(x, y, z)$ is the high-frequency enhancement filter, * is a convolution operator, and $P\{\ \}$ is the probability functional. The probability functional represents the probability that an arbitrary CT value represents the brain parenchyma. The probability functional is 0 if the CT value is −1000 or 1000, is 1 if the CT value is 10 to 20, because the value is at the brain parenchyma level, and is close to 1 if the CT value is a little smaller than 10 or a little greater than 20, because the value approaches the brain parenchyma. The smaller the functional is than 10, or the greater the functional is than 20, the more rapidly the functional approaches 0.

The misregistration calculating unit 118 then calculates the position vector between the binarized combining target image and the mediation image or the misregistration vector between the binarized mediation image and the mediation image (S18). For example, the misregistration calculating unit 118 performs cross-correlation operation between the binarized combining target image and the mediation image or between the binarized mediation image and the mediation image and searches for a misregistration vector which minimizes the correlation value. Briefly, the misregistration calculating unit 118 obtains the difference between the images, calculates the square sum of the difference, and repeats this operation while changing the translation amount and rotational angle. The misregistration calculating unit 118 then determines translation amounts (x1, y1, z1) associated with the X-, Y-, and Z-axes and rotational angles ($\Delta\theta$x1, $\Delta\theta$y2, $\Delta\theta$z3) around the X-, Y-, and Z-axes which minimize the square sum as a misregistration vector.

The image combining unit 119 matches the positions of the two combining target images in accordance with the calculated misregistration vector and combines the resultant images, thereby generating a single combined image (S19).

Specific examples of the above misregistration calculation and image combining processing will be described below.

As shown in FIG. 12, the operator designates, for example, a CT image as one of combining target images. A CT image is an anatomical image (morphological image) representing the morphology of soft tissue, fat tissue, a blood vessel (blood), a bone, or the like which is generated by an X-ray computed tomography apparatus. As the other combining target image, the operator designates a functional image such as a diffusion weighted image, i.e., a so-called DWI (Diffusion Weighted Imaging) image, which is generated by imaging the flow of a spinal fluid or the like using an MRI apparatus, an fMRI (functional MRI) image obtained by imaging the degree of activity of the brain, and a tissue perfusion image or a so-called perfusion MRI image. The CT image as one of the combining target images and the functional image by MRI as the other combining target image are generated in different inspection periods by different modalities, and hence have a misregistration. This misregistration includes no characteristic region common to the two images which can be substituted by a marker, and hence cannot be directly specified by intercomparison. This makes it necessary to use a mediation image.

The image archiving apparatus 106 searches for mediation image candidates for the other combining target image by MRI on the basis of its attribute information. The operator then selects, for example, a T1 weighted image as an anatomical image obtained by imaging a difference in longitudinal relaxation time T1 from the list of mediation image candidates.

The T1 weighted image as a mediation image is generated by the MRI apparatus from the same subject as that of an MRI functional image such as a DWI image as the other combining target image. In addition, these images are consecutively generated in a single inspection period while the subject is placed on the top. Therefore, information such as the top position allows easy elimination of a misregistration other than that caused by the movement of the subject.

This apparatus extracts, for example, a brain parenchyma by a threshold process which is designated as a mediation image calculation target region from the CT image and generates a binary image of the brain parenchyma. Likewise, the apparatus extracts the same brain parenchyma from the T1 weighted image by a threshold process and generates a binary image of the brain parenchyma. The apparatus then calculates a misregistration vector between the binary image originating from the CT image and the binary image originating from the T1 weighted image. As described above, the apparatus obtains the difference between the binary image originating from the CT image and the binary image originating from the T1 weighted image, calculates the square sum of the difference, and repeats this operation while changing the translation amount and rotational angle. The apparatus then determines the translation amounts (x1, y1, z1) associated with the X-, Y-, and Z-axes and the rotational angles ($\Delta\theta$x1, $\Delta\theta$y2, $\Delta\theta$z3) around the X-, Y-, and Z-axes which minimize the square sum as a misregistration vector.

The apparatus matches the positions of the CT image and the MRI functional image in accordance with this misregistration vector and combines them to generate a combined image. Generating a combined image allows to obtain a very useful image which allows to check, on a morphological image of a bone, internal organ, tumor, or the like obtained by CT, a hypoactive region which can be comprehended by, for example, an MRI functional image.

As shown in FIG. 13, the operator designates, for example, a CTA image as one of combining target images. A CTA image is an anatomical image (morphological image) including a blood vessel (blood) enhanced by a contrast medium together with soft tissue, a bone, and the like, which is reconstructed from projection data acquired by helical scanning by the X-ray computed tomography apparatus in accordance with the timing of the injection of the contrast medium.

The operator designates, for example, a functional image such as a T2* weighted image generated by the MRI apparatus as the other combining target image. As in the case shown in FIG. 12, a misregistration has occurred between the CTA image as one of the combining target images and the MRI functional image as the other combining target image, and misregistration calculation requires a mediation image.

An MRA image is selected as an associated mediation image having no misregistration with this T2* weighted image. An MRA image is a blood-vessel-enhanced anatomical image which can be acquired by a flow sequence in an imaging method using a contrast medium, the time-of-flight (TOF) method, the phase contrast method, or the like. This MRA image as a mediation image has rarely misregistration with the T2* weighted image as the other combining target image.

The apparatus extracts a blood vessel from the CTA image by a threshold process and generates a binary image of the blood vessel. Likewise, the apparatus extracts the blood vessel from the MRA image by a threshold process and generates a binary image of the blood vessel. The apparatus then calculates a misregistration vector between the binary image originating from the CTA image and the binary image originating from the MRA image.

The apparatus matches the positions of the CTA image and the MRI T2* weighted image in accordance with the calculated misregistration vector and combines the resultant images to generate a combined image.

Figure 14:
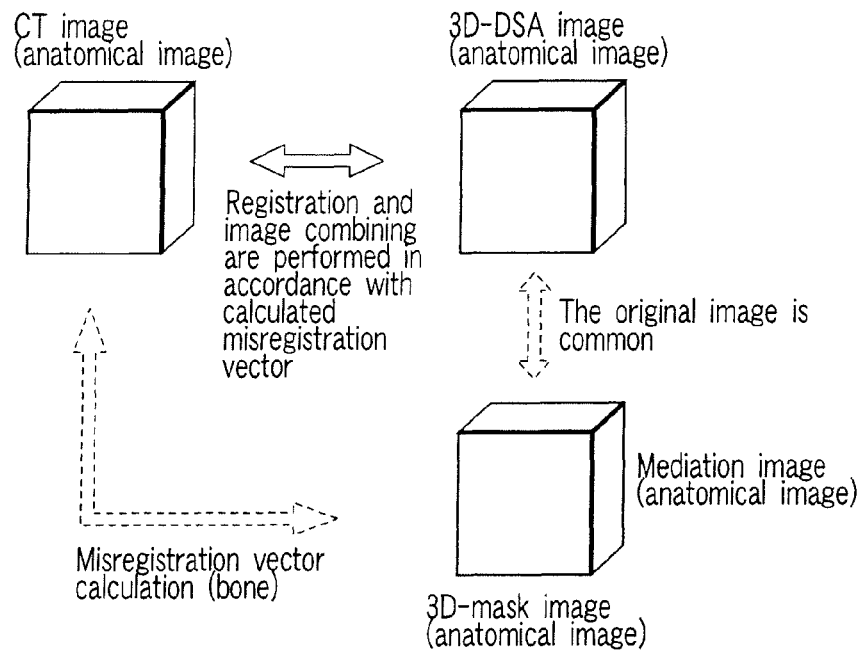
FIG. 14 is a view showing a third specific example of image combining according to the eighth embodiment.

As shown in FIG. 14, the operator designates, for example, a CT image as one of combining target images. A CT image is an anatomical image (morphological image), as described above. The operator designates, for example, a 3D-DSA image generated by the X-ray diagnostic apparatus as the other combining target image. The X-ray diagnostic apparatus generates a 3D-DSA image by repeatedly imaging X-ray images (mask images) before the injection of a contrast medium while rotating around a subject with the C-arm, repeatedly imaging X-ray images (contrast images) after the injection of the contrast medium while rotating around the subject with the C-arm, generating blood-vessel-extracted images by calculating the differences between the mask images and the contrast images at uniform angles, and reconstructing an image from blood-vessel-extracted images in many directions by the same technique as that for CT reconstruction.

Both the CT image and the 3D-DSA image are anatomical images. However, since the CT image mainly comprises the information of a bone and soft tissue, and the 3D-DSA image essentially comprises only blood vessel information, a misregistration between them cannot be directly calculated. The apparatus therefore calculates the misregistration between the CT image and the 3D-DSA image by using a mediation image.

The operator selects, as a mediation image, a 3D mask image originating from a mask image as the original image of the 3D-DSA image by 3D-image processing. The original image (mask image) is common to the 3D-DSA image and the 3D mask image. In theory, therefore, there is no misregistration between these images, and perfect positional matching is achieved.

As a region commonly included in the CT image and the 3D mask image, a bone is designated, in particular, in this case. The apparatus extracts a bone from the CT image by a threshold process and generates a binary image of the bone. The apparatus then calculates a misregistration vector between the binary image originating from the CT image and the 3D mask image.

The apparatus matches the positions of the CT image and 3D-DSA image in accordance with the calculated misregistration vector and combines the resultant images to generate a combined image. This combining operation allows to perform diagnosis while associating the soft tissue information of the CT image with the precise blood vessel information of the 3D-DSA image.

Figure 15:
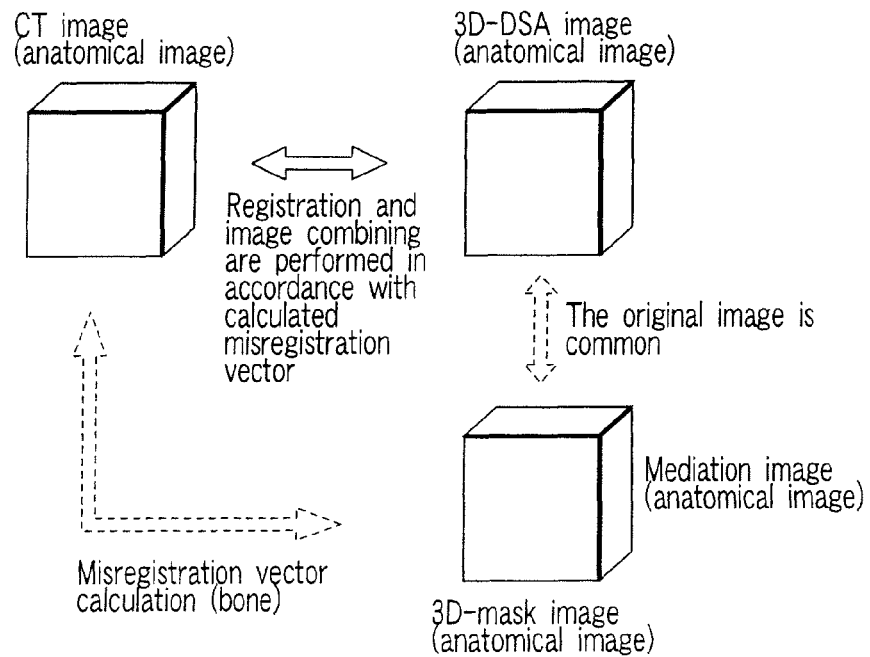
FIG. 15 is a view showing a fourth specific example of image combining according to the eighth embodiment.

As shown in FIG. 15, the operator designates a CTA image as one of combining target images. As described above, a CTA image is an anatomical image (morphological image) including a blood vessel (blood) enhanced by a contrast medium together with soft tissue, a bone, and the like. The operator designates a 3D-DSA image as the other combining target image. As described above, a 3D-DSA image is an anatomical image (morphological image) associated with a blood vessel.

Both the CTA image and the 3D-DSA image are anatomical images and commonly include blood vessels. There is therefore a possible that the apparatus can directly calculate a misregistration through the blood vessels. However, the CTA image includes the information of an artery and the information of a vein, whereas the 3D-DSA image includes only the information of the artery. This difference may cause a great error. For this reason, the apparatus uses a mediation image.

The operator selects, as a mediation image, a 3D mask image originating from a mask image as the original image of the 3D-DSA image. The original image (mask image) is common to the 3D-DSA image and the 3D mask image. In theory, therefore, there is no misregistration between these images, and perfect positional matching is achieved.

As a region commonly included in the CT image and the 3D mask image, a bone is designated, in particular, in this case. The apparatus extracts a bone from the CTA image by a threshold process and generates a binary image of the bone. The apparatus then calculates a misregistration vector between the binary image originating from the CTA image and the 3D mask image.

The apparatus matches the positions of the CTA image and 3D-DSA image in accordance with the calculated misregistration vector and combines them to generate a combined image.

Note that the CTA image includes both artery information and vein information. On the other hand, the 3D-DSA image includes artery information but does not include any vein information. This therefore allows to discriminate the artery from the vein. The apparatus can display the artery and the vein while discriminating them with different colors by using the image processing unit 120.

Figure 16:
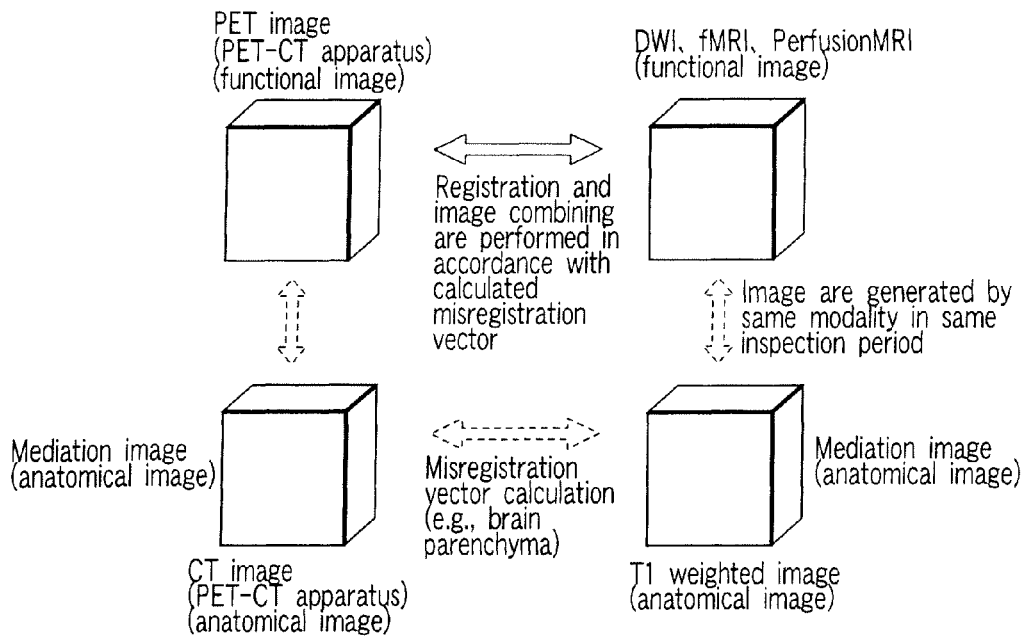
FIG. 16 is a view showing a fifth specific example of image combining according to the eighth embodiment.

As shown in FIG. 16, the operator designates a PET image obtained by the PET-CT apparatus 105 as one of combining target images. A PET image is a functional image representing a metabolic function or the like. The operator designates a functional image such as a DWI image, fMRI image, or perfusion MRI image generated by the MRI apparatus 103 as the other combining target image.

The operator selects, as a mediation image associated with the PET image, a CT image as an anatomical image which is generated by the same PET-CT apparatus 105 in the same inspection period. Misregistration rarely occurs between the PET image and the CT image. In addition, the operator selects, as a mediation image associated with the MRI functional image, a T1 weighted image as an anatomical image which is generated by the same MRI apparatus 103 in the same inspection period.

The apparatus extracts, for example, a brain parenchyma designated as a misregistration calculation target region from the CT image by a threshold process and generates a binary image of the brain parenchyma. Likewise, the apparatus extracts the same brain parenchyma from the T1 weighted image by a threshold process and generates a binary image of the brain parenchyma. The apparatus calculates a misregistration vector between the binary image originating from the CT image and the binary image originating from the T1 weighted image.

The apparatus matches the positions of the PET image and the MRI functional image in accordance with the misregistration vector and combines the images to generate a combined image. A combined image allows to always obtain a useful image which allows comparison diagnosis upon positional matching between the function of the PET image and the function of the MRI image.

Figure 17:
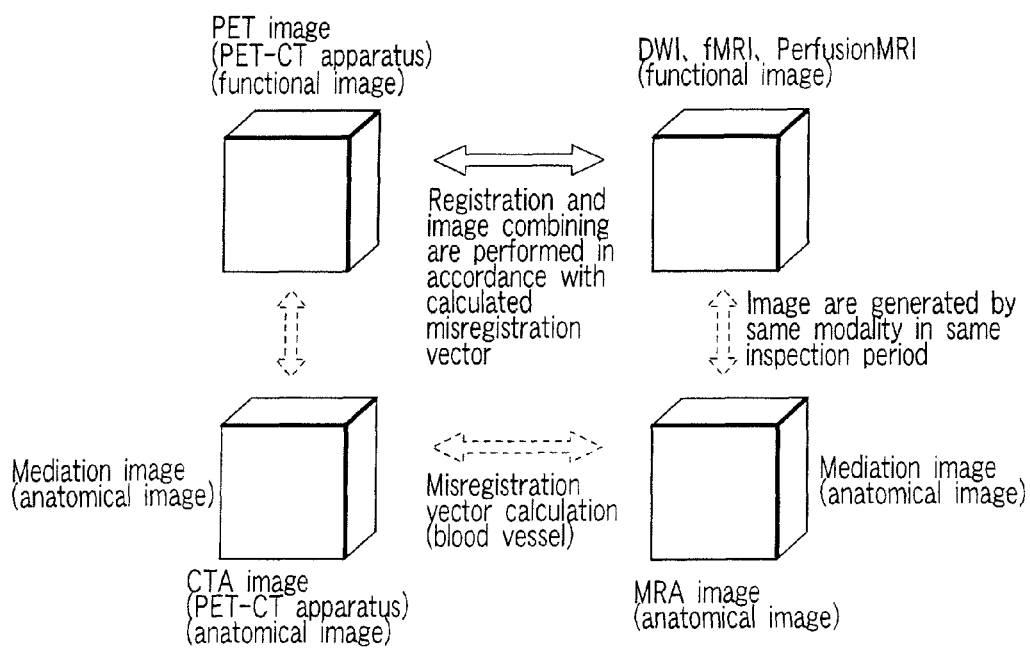
FIG. 17 is a view showing a sixth specific example of image combining according to the eighth embodiment.

As shown in FIG. 17, the operator designates a PET image obtained by the PET-CT apparatus 105 as one of combining target images. A PET image is a functional image representing the metabolic function or the like of an internal organ. The operator designates a functional image such as a DWI image, fMRI image, or perfusion MRI image generated by the MRI apparatus 103 as the other combining target image.

The operator selects, as a mediation image associated with the PET image, a CTA image as an anatomical image which is generated by the same PET-CT apparatus 105 in the same inspection period. Misregistration rarely occurs between the PET image and the CTA image. In addition, the operator selects, as a mediation image associated with the MRI functional image, an MRA mage as an anatomical image which is generated by the same MRI apparatus 103 in the same inspection period.

The apparatus extracts a blood vessel designated as a misregistration calculation target region from the CTA image by a threshold process and generates a binary image of the blood vessel. Likewise, the apparatus extracts the same blood vessel from the MRA image by a threshold process and generates a binary image of the blood vessel. The apparatus calculates a misregistration vector between the binary image originating from the CTA image and the binary image originating from the MRA image.

The apparatus matches the positions of the PET image and the MRI functional image in accordance with the misregistration vector and combines the images to generate a combined image. A combined image allows to always obtain a useful image which allows comparison diagnosis upon positional matching between the function of the PET image and the function of the MRI image.

As shown in FIG. 18, the operator designates, as one of combining target images, a CT perfusion image as a functional image which is generated by the X-ray CT apparatus 102. The operator designates, as the other combining target image, a functional image such as a DWI image, fMRI image, or perfusion MRI image generated by the MRI apparatus 103.

The operator selects, as a mediation image associated with the CT perfusion image, a CT image as an anatomical image generated by the CT apparatus 102 in the same inspection period. Misregistration rarely occurs between the CT perfusion image and the CT image. In addition, the operator selects, as a mediation image associated with the MRI functional image, a T1 weighted mage as an anatomical image which is generated by the same MRI apparatus 103 in the same inspection period.

The apparatus extracts, for example, a brain parenchyma designated as a misregistration calculation target region from the CT image by a threshold process and generates a binary image of the brain parenchyma. Likewise, the apparatus extracts the same brain parenchyma from the T1 weighted image by a threshold process and generates a binary image of the brain parenchyma. The apparatus calculates a misregistration vector between the binary image originating from the CT image and the binary image originating from the T1 weighted image.

The apparatus matches the positions of the CT perfusion image and the MRI functional image in accordance with this misregistration vector and combines the images to generate a combined image. A combined image allows to always obtain a useful image which allows comparison diagnosis upon positional matching between the function of the CT perfusion image and the function of the MRI image.

As shown in FIG. 19, the operator designates, as one of combining target images, a CT perfusion image as a functional image which is generated by the X-ray CT apparatus 102. The operator designates, as the other combining target image, a functional image such as a DWI image, fMRI image, or perfusion MRI image generated by the MRI apparatus 103.

The operator selects, as a mediation image associated with the CT perfusion image, a CTA image as an anatomical image generated by the CT apparatus 102 in the same inspection period. Misregistration rarely occurs between the CT perfusion image and the CTA image. In addition, the operator selects, as a mediation image associated with the MRI functional image, an MRA mage as an anatomical image which is generated by the same MRI apparatus 103 in the same inspection period.

The apparatus extracts, for example, a blood vessel designated as a misregistration calculation target region from the CTA image by a threshold process and generates a binary image of the blood vessel. Likewise, the apparatus extracts the same blood vessel from the MRA image by a threshold process and generates a binary image of the blood vessel. The apparatus calculates a misregistration vector between the binary image originating from the CTA image and the binary image originating from the MRA image.

The apparatus matches the positions of the CT perfusion image and the MRI functional image in accordance with this misregistration vector and combines the images to generate a combined image. A combined image allows to always obtain a useful image which allows comparison diagnosis upon positional matching between the function of the CT perfusion image and the function of the MRI image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A 3D-image processing apparatus comprising:
   a storage unit which stores data of a first 3D image together with data of a second 3D image as a target to be combined with the first 3D image, and which stores data of a third 3D image relevant to the second 3D image;
   a misregistration calculating unit which calculates a misregistration between the first 3D image and the third 3D image; and
   an image combining unit which registers and combines the second 3D image with the first 3D image on the basis of the calculated misregistration,
   wherein the first 3D image is generated by an X-ray computed tomography apparatus, and the second 3D image and the third 3D image are generated by a magnetic resonance imaging apparatus.

2. An apparatus according to claim 1, wherein the first 3D image is an anatomical image, the second 3D image is a functional image, and the third 3D image is an anatomical image.

3. An apparatus according to claim 1, wherein the first 3D image, the second 3D image, and the third 3D image are anatomical images.

4. An apparatus according to claim 1, wherein the third 3D image is generated by the same modality in the same inspection period as those for the second 3D image.

5. An apparatus according to claim 1, wherein the third 3D image originates from the same original image as that of the second 3D image.

6. An apparatus according to claim 1, wherein a position of the third 3D image matches that of the second 3D image.

7. An apparatus according to claim 1, wherein the first 3D image is one of a CT image and a CT angio image, the second 3D image is one of a DWI image, an fMRI image, a perfusion MRI image, and T2* weighted image, and the third 3D image is one of a T1 weighted image and an MR angio image.

8. An apparatus according to claim 1, further comprising an archiving unit which archives data of a plurality of 3D images including the first 3D image, the second 3D image, and the third 3D image, a candidate extracting unit which extracts a plurality of candidate images associated with the third 3D image from said plurality of 3D images on the basis of inspection information of the second 3D image, and a display unit which displays said plurality of extracted candidate images in the form of a list.

9. An apparatus according to claim 1, wherein the misregistration calculating unit calculates a misregistration so as to minimize a difference between the first 3D image and the third 3D image.

10. An apparatus according to claim 1, which further comprises a processing unit which binarizes specific regions of the first 3D image and third 3D image, and in which the misregistration calculating unit calculates a misregistration so as to minimize a difference between the binarized first 3D image and the binarized third 3D image.

11. A 3D-image processing apparatus comprising:

a storage unit which stores data of a first 3D image, second 3D image, and third 3D image associated with the same subject;

a misregistration calculating unit which calculates a first misregistration between the first 3D image and the third 3D image and a second misregistration between the second 3D image and the third 3D image; and an image combining unit which registers and combines the first 3D image and the second 3D image on the basis of the calculated first misregistration and the calculated second misregistration, wherein the first 3D image is generated by an X-ray computed tomography apparatus, and the second 3D image and the third 3D image are generated by a magnetic resonance imaging apparatus.

12. A 3D-image processing apparatus comprising:

a storage unit which stores data of a first 3D image, data of a second 3D image as a combining target with the first 3D image, data of a third 3D image relevant to the first 3D image, and data of a fourth 3D image relevant to the second 3D image;

a misregistration calculating unit which calculates a misregistration between the third 3D image and the fourth 3D image; and an image combining unit which registers and combines the first 3D image and the second 3D image on the basis of the calculated misregistration, wherein the first 3D image is generated by an X-ray computed tomography apparatus, and the second 3D image and the third 3D image are generated by a magnetic resonance imaging apparatus.

13. A 3D-image processing apparatus comprising:

a storage unit which stores data of a first 3D image, second 3D image, third 3D image, and fourth 3D image associated with the same subject;

a misregistration calculating unit which calculates a first misregistration between the first 3D image and the second 3D image, a second misregistration between the second 3D image and the third 3D image, and a third misregistration between the third 3D image and the fourth 3D image; and an image combining unit which registers and combines the first 3D image and the fourth 3D image on the basis of the calculated first misregistration, the calculated second misregistration, and the calculated third mediation image, wherein the first 3D image is generated by an X-ray computed tomography apparatus, and the second 3D image and the third 3D image are generated by a magnetic resonance imaging apparatus.

14. An apparatus according to claim 13, wherein the first 3D image is one of a PET image and CT image generated by a PET-CT apparatus, and the third 3D image is one of a CT image and PET image generated by the PET-CT apparatus.

15. A 3D-image processing apparatus comprising:

a storage unit which stores data of a first 3D image together with data of a second 3D image as a target to be combined with the first 3D image, and which stores data of a third 3D image relevant to the second 3D image;

a misregistration calculating unit which calculates a misregistration between the first 3D image and the third 3D image; and an image combining unit which registers and combines the second 3D image with the first 3D image on the basis of the calculated misregistration, wherein the first 3D image is generated by an X-ray computed tomography apparatus, and the second 3D image and the third 3D image are generated by an X-ray diagnostic apparatus.

16. An apparatus according to claim 15, wherein the first 3D image is one of a CT image and a CT angio image, the second 3D image is a 3D-DSA image, and the third 3D image is a 3D mask image.

17. A 3D-image processing method comprising:

inputting into a storage unit data of a first 3D image together with data of a second 3D image as a target to be combined with the first 3D image, and inputting into the storage unit data of a third 3D image relevant to the second 3D image;

calculating in a calculation unit a misregistration between the first 3D image and the third 3D image; and registering and combining the second 3D image with the first 3D image on the basis of the calculated misregistration, wherein the first 3D image is generated by an X-ray computed tomography apparatus, and the second 3D image and the third 3D image are generated by a magnetic resonance imaging apparatus.

18. A non-transitory computer-readable storage medium recording computer executable instructions for causing a computer to implement:

storage means for storing data of a first 3D image together with data of a second 3D image as a target to be combined with the first 3D image, and for storing data of a third 3D image relevant to the second 3D image;

means for calculating a misregistration between the first 3D image and the third 3D image; and means for registering and combining the second 3D image with the first 3D image on the basis of the calculated misregistration, wherein the first 3D image is generated by an X-ray computed tomography apparatus, and the second 3D image and the third 3D image are generated by a magnetic resonance imaging apparatus.

* * * * *